US006255403B1

(12) United States Patent
Andrist et al.

(10) Patent No.: US 6,255,403 B1
(45) Date of Patent: Jul. 3, 2001

(54) PROCESS FOR PRODUCING POLYMERS BY FREE RADICAL POLYMERIZATION AND CONDENSATION REACTION, AND APPARATUS AND PRODUCTS RELATED THERETO

(75) Inventors: Kevin M. Andrist; John D. Campbell, both of Racine, WI (US); Richard Chylla, Hilversum (NL); Jon A. Debling, Oak Creek; Douglas J. DeYoung, Racine, both of WI (US); Michihiro Kaai, Toyoake; Tsugio Kimura, obu, both of (JP); Dennis M. Wilson, Kenosha, WI (US)

(73) Assignee: S. C. Johnson Commercial Markets, Inc.

( * ) Notice: Subject to any disclaimer, the term of this patent is extended or adjusted under 35 U.S.C. 154(b) by 0 days.

(21) Appl. No.: 09/347,033

(22) Filed: Jul. 2, 1999

Related U.S. Application Data
(60) Provisional application No. 60/092,433, filed on Jul. 10, 1998.

(51) Int. Cl.[7] .................................................. C08F 8/00
(52) U.S. Cl. .............................. 525/326.1; 525/327.4; 525/327.7; 525/328.2; 525/330.1; 525/330.6; 526/301; 526/303.1; 526/312; 526/317.1; 526/210; 526/212; 526/271; 526/328.5
(58) Field of Search .................... 526/301, 303.1, 526/312, 317.1, 210, 212, 271, 328.5; 525/327.4, 327.7, 328.2, 330.1, 330.6, 326.1

(56) References Cited

U.S. PATENT DOCUMENTS

| 3,859,268 | 1/1975 | Novack et al. |
| 3,884,857 | 5/1975 | Ballard et al. |
| 3,968,059 | 7/1976 | Shimada et al. ............... 526/68 |
| 4,414,370 | 11/1983 | Hamielec et al. ............... 526/88 |
| 4,529,787 | 7/1985 | Schmidt et al. ............... 526/317 |
| 4,546,160 | 10/1985 | Brand et al. ............... 526/320 |
| 4,559,156 | 12/1985 | Greaves et al. ............... 252/82 |
| 4,954,567 | 9/1990 | Oishi et al. ............... 525/62 |
| 5,130,369 | 7/1992 | Hughes et al. ............... 524/846 |
| 5,292,803 | 3/1994 | Ohmae et al. ............... 525/61 |
| 5,352,750 | 10/1994 | Yanai et al. ............... 526/225 |
| 5,399,612 | 3/1995 | Calhoun ............... 524/506 |
| 5,521,267 | 5/1996 | Giencke et al. ............... 526/201 |
| 5,596,057 | 1/1997 | Epple et al. ............... 526/273 |
| 5,665,822 | 9/1997 | Bitler et al. ............... 525/92 |
| 5,679,735 | 10/1997 | Geissler et al. ............... 524/459 |
| 5,710,227 | 1/1998 | Freeman ............... 526/208 |

FOREIGN PATENT DOCUMENTS

| 0701239A | 2/1983 | (EP) ............... 220/6 |
| 879 852 | 11/1998 | (EP). |
| 885 906 | 12/1998 | (EP). |
| 896 027 | 2/1999 | (EP). |
| 1114453A | 4/1956 | (FR) ............... 14/8 |
| WO 90/03991 | 4/1990 | (WO) ............... 61/4 |
| WO 98/04593 | 2/1998 | (WO). |

OTHER PUBLICATIONS

Boutier et al., "New Oil Soluble Esters Resins for Graphic Arts", *American Ink Maker*, vol. 75, No. 1, pp. 50–52 (Jan. 1997).

*Primary Examiner*—Rachel Gorr
(74) *Attorney, Agent, or Firm*—Renee J. Rymarz; Neil E. Hamilton; Warren R. Bovee

(57) ABSTRACT

The present invention provides a high temperature continuous polymerization and condensation process for preparing a polymeric product. The process includes continuously charging into a reaction zone: at least one radically-polymerizable monomer having a radically polymerizable group and at least one condensation reactive functionality; and at least one modifying agent having a functional group capable of reacting with the condensation reactive functionality. The reaction zone includes at least one primary reactor, but may, and preferably does, contain a secondary reactor. The process further includes maintaining an effective temperature in the primary reactor to cause polymerization of the monomer and to allow at least a portion of the condensation reactive functionality to react with the functional group of the modifying agent.

107 Claims, 2 Drawing Sheets

PROCESS FOR PRODUCING POLYMERS BY FREE RADICAL POLYMERIZATION AND CONDENSATION REACTION, AND APPARATUS AND PRODUCTS RELATED THERETO

REFERENCE TO RELATED APPLICATION

This application claims the benefit of provisional patent application Ser. No. 60/092,433, filed Jul. 10, 1998, the disclosure of which is incorporated by reference.

FIELD OF THE INVENTION

The present invention generally relates to a continuous polymerization and condensation process for converting a radically-polymerizable monomer with a condensation reactive functionality and a modifying agent with a functional group capable of reacting with the condensation reactive functionality into a polymeric product. The invention also relates to polymeric products produced by the process and to various products that contain the polymeric product.

BACKGROUND OF THE INVENTION

Processes for preparing polymers are well known in the art. However, many of the processes used to date to produce polymers for industrial use suffer from significant limitations, including high cost, significant gelation problems when a high degree of functionality is present, and an inability to produce polymers having particular desirable characteristics.

U.S. Pat. No. 4,414,370 discloses a continuous bulk polymerization process for polymerizing vinylic monomers to prepare low molecular weight polymers employing thermal initiation at reaction temperatures from 235° C. to 310° C. and residence times of at least 2 minutes in a continuous stirred reactor zone. The vinylic monomers of the disclosed process include styrenic monomers such as styrene and x-methylstyrene; acrylic monomers such as acrylic acid, methacrylic acid, acrylates, methacrylates; and other non-acrylic ethylenic monomers such as vinyl acetate.

U.S. Pat. No. 4,529,787 discloses a continuous bulk polymerization process including an initiator for preparing low molecular weight, uniform polymers from vinylic monomers at short residence times and moderate reaction temperatures to provide high yields of a product suitable for high solids applications. The disclosed vinyl monomers include styrenic monomers such as styrene and x-methylstyrene; acrylic monomers such as acrylic acid, methacrylic acid, acrylates, methacrylates, and functional acrylic monomers; and non-acrylic ethylenic monomers such as maleic anhydride and vinyl pyrrolidinone.

U.S. Pat. No. 4,546,160 discloses a continuous bulk polymerization process for polymerizing acrylic monomers to prepare low molecular weight, uniform, polymers for use in high solids applications which uses a minor amount of initiator at short residence times and moderate temperatures.

Various attempts have been made to improve the physical properties of polymers by replacing one type of polymerizable monomer for another, or by reacting a polymer with a group that will be incorporated into the polymeric structure. For example, U.S. Pat. No. 5,130,369 discloses a process for preparing functionalized polymeric compositions.

U.S. Pat. No. 5,521,267 discloses a process for preparing polymers from ethylenically unsaturated compounds containing acid groups with further ethylenically unsaturated compounds and monohydroxy compounds.

There has been no disclosure as to how a polymerization and condensation process can be performed in a continuous manner with high conversion such that gelation is avoided in such processes where cross-linking is possible due to multiple functionality on one or more of the components.

The polymer industry has long known that continuous polymerization processes are useful for obtaining large quantities of polymeric product. Furthermore, optimized continuous processes provide economic advantages over batch polymerization processes and may provide more uniform polymeric products. Additionally, many radically-polymerizable monomers containing desirable modifying groups are considerably more expensive than the precursors that they are made from. Thus, while continuous processes have been disclosed for the preparation of certain polymeric products for use in high solids coatings applications, a high temperature continuous process is needed for preparing polymeric products with improved characteristics achieved through reaction conditions and incorporation of a desired modifier in the reaction zone. Furthermore, a need remains for a continuous polymerization process in which a modifying agent may be incorporated into a polymeric chain with a high degree of conversion while also allowing for the architecture of the polymeric chain to be manipulated.

SUMMARY OF THE INVENTION

It would be highly desirable to be able to produce a polymeric product using a continuous polymerization and condensation reaction wherein a modifying agent is incorporated into the polymeric chain in the reaction zone while gelation is avoided and manipulation of the architecture of the polymeric chain is allowed.

One object of the invention is to provide a continuous polymerization and condensation process including continuously charging into at least one primary reactor: at least one radically-polymerizable monomer having a radically polymerizable group and also having at least one condensation reactive functionality; and at least one modifying agent having at least one functional group capable of reacting with the condensation reactive functionality on the radically-polymerizable monomer. The process also includes maintaining an effective temperature in the primary reactor sufficient to cause polymerization of the monomer and to allow at least a portion of the condensation reactive functionality to react with the functional group of the modifying agent such that a first polymeric product is produced which incorporates at least some of the modifying agent and the polymeric product is formed substantially free of gelation.

In some preferred processes, at least two different radically-polymerizable monomers are charged into the primary reactor while in other preferred embodiments the radically-polymerizable monomer has at least two condensation reactive functionalities. In some preferred processes, the modifying agent has one functional group capable of reacting with the condensation reactive functionality while other preferred processes include modifying agents with more than one such functional group. In some preferred processes the two functional groups on a multifunctional modifying agent are similar, while in others they are different from one another. Multifunctional modifying agents may be polymeric or non-polymeric, and in various preferred processes both a monofunctional modifying agent and a multifunctional non-polymeric modifying agent are employed.

A polymeric product of the process may contain a cyclohexyl group, and in preferred processes the radically-polymerizable monomer is acrylic acid and the modifying agent is cyclohexanol. In other preferred processes, at least one vinyl aromatic monomer is continuously charged into the primary reactor while in still other preferred processes at least two different vinyl aromatic monomers are charged into the reaction zone.

In preferred processes, the condensation reactive functionality is a carboxyl, an ester, an anhydride, a hydroxy, an epoxy, an amine, a ketone, an aldehyde, or an isocyanate functionality while in other preferred processes, the functional group of the modifying agent is a carboxyl, a hydroxy, an anhydride, an amine, an epoxy, or an isocyanate group.

In various preferred processes, the temperature is maintained between about 175° C. and about 345° C. in the primary reactor while in other preferred processes the temperature is maintained above 300° C. In still other preferred processes, the flow rate through the primary reactor is maintained to provide an average residence time of 60 minutes or less in the primary reactor.

In some preferred processes, one or more additional components such as a radically-polymerizable monomer substantially free of condensation reactive groups, an inert solvent, a byproduct removal agent, or an initiator are added to one or more reactors in the process while in other preferred processes a catalyst such as an esterification, transesterification, or amidation catalyst is added to one of the reactors. In still other preferred processes, the reaction zone is substantially free of an inert solvent.

In yet other preferred processes, the process further includes a secondary reactor and the process further includes charging the first polymeric product from the primary reactor into the secondary reactor and thereafter removing a second polymeric product from the secondary reactor. In some preferred processes the primary reactor is a continuous stirred tank reactor or a loop reactor while in other preferred embodiments the secondary reactor is a loop reactor, a tube reactor, an extruder reactor, or a continuous stirred tank reactor or any reactor suitable for continuous operation. In still other preferred processes, at least one of the polymeric products is continuously charged into an extruder reactor and additional modifying agent is charged into the extruder reactor to produce a polymeric product. The product can be added to a batch reactor for further modification. In still other preferred processes, the temperature in the primary and secondary reactors are different from one another, and are preferably independently controlled.

In various preferred processes, at least a portion of the modifying agent is added to the secondary reactor while in other preferred processes the modifying agent is added to two different reaction zones in the secondary reactor. In still other preferred processes, at least two different modifying agents are added to each of two different reaction zones in the secondary reactor.

In preferred processes, at least one reactor in the reaction zone includes a headspace and the process includes purging the headspace with an inert gas. In more preferred processes, a volatile material is separated from the primary reactor to produce two streams. One of the streams is relatively free of byproduct while the other stream contains unreacted starting materials. In preferred processes, the stream that is relatively free of byproduct is added to a reactor in the reaction zone.

Another object is to provide a polymerization and condensation process which includes charging into a reaction zone at least one radically-polymerizable monomer having a radically polymerizable group and also having at least one condensation reactive functionality; and at least one modifying agent having at least one functional group capable of reacting with the condensation reactive functionality on the radically-polymerizable monomer. The modifying agent is a polyamide, a polyurethane, a polyacrylate, or a polyorganosiloxane, and the process includes maintaining the temperature in the reaction zone at an effective temperature to cause polymerization of the monomer and to allow at least a portion of the condensation reactive functionality to react with the functional group of the modifying agent to produce a polymeric product.

Yet another object is to provide a continuous polymerization and condensation process including continuously charging into a primary reactor at least one radically-polymerizable monomer having a radically polymerizable group and also having at least one condensation reactive functionality, with the primary reactor being free of any modifying agent. The process also includes maintaining the temperature in the primary reactor at an effective temperature to cause polymerization of the monomer to produce a first polymeric product; charging the first polymeric product into a secondary reactor; and charging the secondary reactor with at least one modifying agent having at least one functional group capable of reacting with the condensation reactive functionality to react with the functional group of the modifying agent to produce a second polymeric product.

Still another object of the invention is a continuous polymerization and condensation process, which includes continuously charging into a reactor at least one radically-polymerizable monomer having a radically polymerizable group and also having at least one condensation reactive functionality together with at least one modifying agent. The modifying agent has at least one functional group capable of reacting with the condensation reactive functionality on the radically-polymerizable monomer. In a preferred embodiment, each modifying agent is a monohydroxy alcohol; however, each modifying agent is not a monohydroxy alcohol having the formula ROH, wherein R is a linear or branched chain alkyl radical having greater than 11 carbon atoms. Further the polymerization takes place in the absence of any monohydroxy alcohol having the formula ROH, with R being a linear or branched chain alkyl radical having greater than 11 carbon atoms. The temperature in the reactor is maintained at an effective temperature in the reactor to cause polymerization of the monomer and to allow at least a portion of the condensation reactive functionality to react with the functional group of the modifying agent to produce a polymeric product which incorporates at least some of the modifying agent.

Still another object is to provide the polymeric product prepared by any of the above processes and to provide overprint varnishes, coatings, coating modifiers and compatibilizers, dispersants, surfactants, and paints including the polymeric product. Still further objects, features, and advantages of the invention will be apparent from the following detailed description when taken in conjunction with the drawings.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF THE INVENTION

Figure 1:
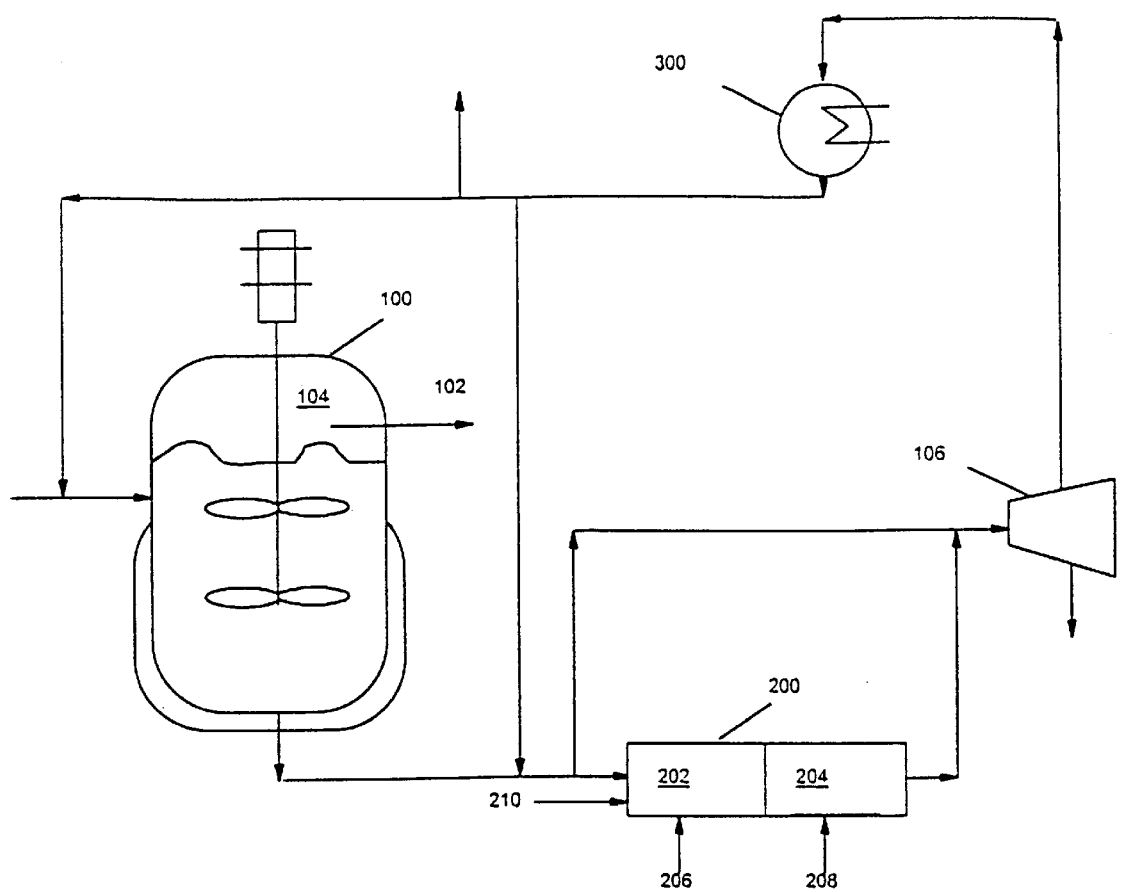
FIG. 1 is a schematic diagram of a polymerization reactor network utilized in the present invention.

The present invention provides continuous processes for producing polymer compositions by free radical polymerization in the presence of one or more modifying agents. The term "continuous" is herein defined as a process wherein a reactant, such as a modifying agent and/or radically polymerizable monomer, is fed into a reactor while a polymeric product is removed simultaneously during at least part of the reaction process.

The invention allows for the incorporation of modifying agents to a relatively high degree not previously possible in conventional free radical polymerization processes, allows high molecular weight polymeric products to be obtained at high temperatures, allows for cross-linked polymeric products to be obtained, and provides a method of shifting the molecular architecture of polymeric products.

Generally, a continuous polymerization and condensation process according to the present invention includes continuously charging into a reaction zone at least one radically-polymerizable monomer and at least one modifying agent. The reaction zone has at least one primary reactor, but preferably also includes a secondary reactor. The radically-polymerizable monomer has a radically-polymerizable group in addition to having at least one condensation reactive functionality. The modifying agent has at least one functional group capable of reacting with the condensation reactive functionality on the radically-polymerizable monomer. The temperature in the primary reactor is maintained at an effective temperature to cause polymerization of the monomer and to allow at least a portion of the condensation reactive functionality to react with the functional group of the modifying agent. In this manner, a polymeric product is produced which incorporates at least some of the modifying agent and the polymeric product is formed substantially free of gelation.

The reaction between the condensation reactive functionality of the radically-polymerizable monomer and the functional group of the modifying agent is a condensation reaction rather than a free radical polymerization mechanism. Condensation reactions are well known in the art and are defined herein as any reaction which involves the combination of two molecules, one molecule having at least one functional group capable of reacting with a condensation reactive functionality on the other, to form a larger molecule. The condensation reaction may or may not be accompanied by the elimination of a small molecule. The small molecule eliminated during a condensation reaction is referred to as a condensation byproduct or byproduct. Examples of some preferred condensation reactions include esterification reactions, transesterification reactions, and amidation reactions. Even though transesterification reactions do not always lead to the formation of a large molecule product and a small molecule byproduct, they are commonly classified as condensation reactions, and will be referred to as such herein. Condensation reactions may be self-catalyzed or alternatively may be catalyzed using a wide variety of catalysts referred to as condensation catalysts. As noted, the modifying agent is incorporated in the final polymeric product of the invented process. Incorporation of the modifying agent imparts desirable properties in the polymeric product, and generally utilizes less expensive precursors and other materials than alternative procedures to achieve this result.

The radically-polymerizable monomer used in the process contains one or more condensation reactive functionalities. Examples of suitable condensation reactive functionality of the radically-polymerizable monomer include, but are not limited to, carboxyl, hydroxy, anhydride, amine, epoxy, isocyanate, ketone, aldehyde, amide and ester functionalities.

Various carboxyl- and ester-containing radically-polymerizable monomers may be used in the high temperature continuous polymerization and condensation process. Examples of carboxyl-containing radically-polymerizable monomers include, but are not limited to, acrylic acid, methacrylic acid, and maleic acid. Examples of ester-containing radically-polymerizable monomers, include acrylates, methacrylates, diacrylates and dimethacrylate monomers. Preferred examples include, but are not limited to, butyl acrylate, 2-ethylhexyl acrylate, cyclohexyl acrylate, cyclohexyl methacrylate, ethyl acrylate, methyl acrylate, methyl methacrylate, isobutyl acrylate, isobutyl methacrylate, butyl methacrylate, ethylene glycol diacrylate, ethylene glycol dimethacrylate and 1,6-hexanediol diacrylate. Other examples of ester-containing radically-polymerizable monomers include, but are not limited to, 1-butylaminoethyl methacrylate, 2-chloroethyl methacrylate, 2-ethoxyethyl methacrylate, 2-ethylbutyl methacrylate, 2-ethylhexyl methacrylate, 2-hydroxyethyl methacrylate, 2-hydroxypropyl methacrylate, 2-methoxybutyl methacrylate, 2-n-butoxyethyl methacrylate, 2-nitro-2-methylpropyl methacrylate, 2-phenoxyethyl methacrylate, 2-phenylethyl methacrylate, 2-sulfoethyl methacrylate, 3-methoxybutyl methacrylate, allyl methacrylate, benzyl methacrylate, butylaminoethyl methacrylate, cinnamyl methacrylate, crotyl methacrylate, cyclopentyl methacrylate, ethyl acrylate, ethyl methacrylate, furfuryl methacrylate, glycidyl methacrylate, hexafluoroisopropyl methacrylate, isoamyl methacrylate, isobutyl methacrylate, isopropyl acrylate, isopropyl methacrylate, methyl 2-cyanoacrylate, methyl acrylate, methyl u-chloroacrylate, n-amyl methacrylate, n-butyl methacrylate, n-decyl acrylate, n-hexyl methacrylate, N,N-diethylaminoethyl methacrylate, N,Ndimethylaminoethyl methacrylate, n-octyl methacrylate, n-propyl acrylate, n-propyl methacrylate, phenyl methacrylate, sec-butylmethacrylate, t-butyl methacrylate, tetrahydrofurfuryl methacrylate, tetrahydropyryl methacrylate, and trifluoroethyl methacrylate.

The radically-polymerizable monomer may also include an anhydride, a ketone, an aldehyde, an epoxy, or a hydroxy condensation reactive functionality. Examples of anhydride-containing radically-polymerizable monomers include, but are not limited to, maleic anhydride, itaconic anhydride and citraconic anhydride. Examples of ketone- and aldehyde-containing radically-polymerizable monomers include, but are not limited to, methacrolein, methyl vinyl ketone and acrolein. Examples of epoxy-containing radically-polymerizable monomers for use in the process include, but are not limited to, glycidyl methacrylate, glycidyl acrylate and 4-vinyl-1-cyclohexene 1,2 epoxide. Hydroxy-containing radically-polymerizable monomers that can be used in the process include, but are not limited to, hydroxy acrylates and methacrylates such as 2-hydroxy ethyl methacrylate, 2-hydroxy ethyl acrylate, hydroxy propyl acrylate, 3-chloro-2-hydroxy-propyl acrylate, 2-hydroxybutyl acrylate, 6-hydroxyhexyl acrylate, 2-hydroxymethyl methacrylate, 2-hydroxypropyl methacrylate, 6-hydroxyhexyl methacrylate, and 5,6-dihydroxyhexyl methacrylate.

Various amine- and isocyanate- containing monomers may be used in the high temperature continuous polymerization and condensation process. Examples of amine-containing radically-polymerizable monomers include, but are not limited to, 2-(diethylamino)ethyl acrylate, 2-(dimethylamino)ethyl acrylate, 2-(dimethylamino)propyl acrylate, 2-(diethylamino)ethyl methacrylate, 2-(dimethylamino)ethylmethacrylate, 2-(dimethylamino) propylacrylate. Examples of isocyanate-containing monomers include, but are not limited to, 3-isopropenyl-α,α-dimethylbenzyl isocyanate and 2-isocyanatoethyl methacrylate.

Still other radically-polymerizable monomers containing condensation reactive functionalities include amides such as acrylamide, N-ethyl acrylamide, N,N-diethyl acrylamide methacrylonitrile, methacrylamide, N-methyl methacrylamide, N-ethyl methacrylamide, N,N-diethyl methacrylamide, N,N-dimethyl methacrylamide, and N-phenyl methacrylamide.

The functional group of the modifying agent capable of reacting with the condensation reactive functionality on the radically-polymerizable monomer includes carboxyl, hydroxy, anhydride, amine, epoxy, ketone, aldehyde, ester, and isocyanate groups. The modifying agent contains one or more such functional groups, and at least some of the functional groups react with the condensation reactive functionalities on the radically-polymerizable monomer. Furthermore, one or more different modifying agents may be used in the various processes of the invention.

In preferred processes, the modifying agent contains only one functional group. Such modifying agents are termed monofunctional modifying agents.

Examples of hydroxy-containing monofunctional modifying agents include aliphatic, alicyclic, aromatic, and aromatic alkyl alcohols, and derivatives thereof. Other examples include haloalcohols such as fluoroalkyl alcohol, dodecafluoroheptanol, octafluoropentanol, and heptafluoro isopropanol. Further examples of alcohols include hindered amine light stabilizers such as N-methyl-22,66,tetramethyl-4-pipiridinol and 2,2,6,6 tetramethyl-4-pipiridinol. Preferable modifying agents containing hydroxy condensation reactive groups include primary and secondary alcohols. Exemplary primary alcohols include cyclohexylmethanol, 4-methylcyclohexylmethanol and cyclohexylethanol, propanol, butanol, 2-ethylhexanol, and diethylene glycol monoethyl ether while exemplary secondary alcohols include cyclohexanol, isopropanol, isobutanol, isooctanol, and isoborneol.

In a preferred embodiment, the modifying agent is not an alkanol having the formula R—OH, wherein R is a straight or branched chain alkyl group having 12 or more carbon atoms.

In a preferred process, the modifying agent contains a carboxyl functional group. For example, preferred monofunctional modifying agents include cyclohexane carboxylic acid.

Other preferred monofunctional modifying agents include an amine functional group. The amine functional group may be a primary amine or a secondary amine. Examples of primary and secondary amine-containing monofunctional modifying agents include ethylamine, propylamine, butylamine, cyclohexylamine, isopropylamine, benzyl amine, and polyether amines.

In other preferred processes, the modifying agent contains more than one functional group capable of reacting with the condensation reactive functionality on the radically-polymerizable monomer. These modifying agents are referred to as multifunctional modifying agents. The multifunctional modifying agent may have more than one functional group capable of reacting with the monomer or, alternatively, the multifunctional modifying agent can contain only one functional group capable of reacting with the condensation reactive groups and the remaining functional groups are capable of reacting with each other to produce cross links in the polymer. In one preferred process, hydroxyethyl methacrylate is used as the radically polymerizable monomer and adipic acid is used as the multifuntional non-polymeric modifying agent. In a more preferred process, a multifunctional, non-polymeric modifying agent has more than one functional group capable of reacting with a condensation reactive functionality on a radically-polymerizable monomer with a condensation reactive functionality. Cross-linking and branching in the polymeric product are thus induced by the incorporation of the multifunctional modifying agent into at least two different polymer chains. In these preferred processes, the multifunctional, non-polymeric modifying agent includes difunctional, trifunctional, and other species with a higher degree of functionality. The use of a non-polymeric multifunctional modifying agent in the polymerization and condensation reaction leads to an increase in the molecular weight of the polymeric product. For example, when ethylene glycol is used as the modifying agent in conjunction with acrylic acid as a radically-polymerizable monomer, the polymeric product of the polymerization and condensation reaction has an increased molecular weight. Since the molecular weight of polymers produced by free radical polymerization normally decreases as the process temperature is increased, especially when chain cleavage by scission is occurring, a process using a multifunctional modifying agent provides a method of increasing the molecular weight of the polymer product at high polymerization temperature. Because the molecular weight of most non-polymeric multifunctional modifying agents is generally small, only minor amounts, by weight, are required to achieve significant increases in the molecular weight of polymeric products.

Preferred multifunctional, non-polymeric modifying agents include those bearing the hydroxy functionality. Examples of such hydroxy-containing multifunctional, non-polymeric modifying agents include, but are not limited to, ethylene glycol, tri(ethylene) glycol, butylene glycol, propylene glycol, di(propylene) glycol, neopentyl glycol, glycerol, cyclohexane dimethanol, 2-methyl-1,3-propanediol, 3-methyl-2,4-pentanediol, 1,10-decanediol, 1,6-hexanediol, 1,5-pentanediol, pentaerythritol, trimethylol ethane and trimethylolpropane. As used herein, the term "monohydroxy alcohol" is defined as any alcohol which has only a single —OH functionality. Monohydroxy alcohols include, but are not limited to, aromatic, cyclic and aliphatic alcohols, both saturated and unsaturated. In a one embodiment, the modify agent is not a monohydroxy alcohol and some or all of the reactors are free of monohydroxy alcohols. In another embodiment, the modifying agents include, but are not limited to, diols, triols, tetraols and other multifunctional alcohols. In another preferred embodiment, one or more of the reactors contain only monohydroxy alcohols as the modifying agent, wherein the monohydroxy alcohols do not have the formula ROH where R is a linear or branched chain alkyl moiety having greater than 11 carbon atoms. In still another preferred embodiment, multiple modifying agents are used in a single reactor, wherein at least one of the modifying agents in the single reactor is not a monohydroxy alcohol.

Other preferred multifunctional modifying agents include cyclic esters and amides. These include but are not limited to structures such as Formula 1, where n can be 0–7, and X=S, 0 or N. These materials can be used when the functional monomer comprises acid or hydroxyl functionality. The resulting polymeric product contains side branches comprised of the polymeric sequences. Such polymers are described as comb like and can be prepared in this process without the risk of substantial gelation. Those skilled in the art will recognize that a combination of different non-polymeric multifunctional modifying agents, each having at least two different type of functional group thereon, may be used in this process in varied proportions to obtain a polymeric product with desired properties.

FIG. 1

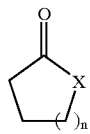

Other preferred multifunctional, non-polymeric modifying agents include the amine functionality. Examples of amine-containing multifunctional, non-polymeric modifying agents include, but are not limited to, hexamethylene diamine, p-phenylene diamine, ethylene diamine, isophorone diamine, and 2-methyl-1,5-pentane diamine.

Still other preferred multifunctional, non-polymeric modifying agents include those with carboxyl or anhydride functionality. Examples of these multifunctional, non-polymeric modifying agents include, but are not limited to, adipic acid, azelaic acid, trimesic acid, phthalic acid, isophthalic acid, dodecanedioic acid, terephthalic acid, 1,4-cyclohexanedicarboxylicacid, sebacic acid, and trimellitic anhydride.

Other preferred multifunctional, non-polymeric modifying agents include a combination of functional groups capable of reacting with condensation reactive functionalities. The condensation reactive functionalities that the functional groups of these multifunctional, non-polymeric modifying agents react with preferably include carboxyl, hydroxy, amine, ester, anhydride, isocyanate, and epoxy reactive functionalities. Thus, certain preferred multifunctional, non-polymeric modifying agents contain at least two different types of functional group capable of reacting with condensation reactive functionalities on radically-polymerizable monomers. The different types of functional groups on these multifunctional modifying agents are preferably capable of reacting with each other to form sequences of combined modifying agent units which may be incorporated into the polymer.

In other preferred processes, the modifying agent is an amino acid or a hydroxy acid. Examples of preferred amino acid modifying agents include, but are not limited to alanine, glycine, lysine, leucine, isoleucine and phenylalanine while examples of hydroxy acid modifying agents include, but are not limited to glycolic acid, lactic acid, mandelic acid, benzilic acid, 4-hydroxybutanoic acid, 12-hydroxystearic acid, and 12-hydroxydodecanoicacid.

Other preferred multifunctional, non-polymeric modifying agents have only two functional groups that are distinct and capable of reacting with condensation reactive functionalities on radically-polymerizable monomers. Still other preferred multifunctional, non-polymeric modifying agents have the structure HO—R—C(=O)OH or $H_2N$—R—C (=O)OH, where R denotes a linking chemical group such as, but not limited to, a chain of methylene units, an aromatic group, or a combination of these. This class of multifunctional, non-polymeric modifying agent can react with other such modifying agents to form linear polymeric sequences represented by the formula HO—(R—C(=O)O)$_n$—R—C(=O)OH or $H_2N$—(R—C(=O)N(H))$_n$—R—C (=O)OH where n is a variable greater than or equal to 1. In more preferred processes, the radically-polymerizable monomer contains carboxyl or hydroxy functionalities and the modifying agent is multifunctional, non-polymeric, and has the structure HO—R—C(=O)OH or $H_2N$—R—C (=O)OH as described above. The resulting polymeric product contains side branches comprised of the polymeric sequences. Such polymers are described as comb like and can be prepared in this process without the risk of substantial gelation. Those skilled in the art will recognize that a combination of different non-polymeric multifunctional modifying agents, each having at least two different type of functional group thereon, may be used in this process in varied proportions to obtain a polymeric product with desired properties.

One functional group on multifunctional, non-polymeric modifying agents bearing more than one functional group may react more or less readily than the other with the condensation reactive functionality on a radically-polymerizable monomer. Thus, polymeric products with dual functionality may be produced by the polymerization and condensation reaction process. In preferred processes, the less reactive functional group on such multifunctional modifying agent may be sterically hindered. Reaction conditions may be chosen in the polymerization and condensation process of the invention such that only partial conversion of the multifunctional non-polymeric modifying agent occurs during the polymerization. This provides another method of providing a polymeric product with dual functionality.

More than one type of modifying agent may be used in the polymerization and condensation process. For example, preferred processes include both a multifunctional, non-polymeric, and a monofunctional modifying agent. This combination of modifying agents allows high levels of the monofunctional modifying agent to be incorporated in the polymer without sacrificing the molecular weight of the polymeric product. Generally, elevating the temperature in the primary polymerization reactor and, optionally, the secondary polymerization reactor provides high conversion, or incorporation, of the monofunctional modifying agent. However, as previously noted, increased temperatures in the reaction zone generally leads to polymeric products with decreased molecular weight. The addition of the multifunctional non-polymeric modifying agent provides sufficient cross-linking to provide a polymeric product with a satisfactory molecular weight and a high level of incorporation of the monofunctional modifying agent. In preferred such processes, the radically-polymerizable monomer includes a carboxyl functionality, the monofunctional modifying agent includes a hydroxy functional group, and the multifunctional, non-polymeric modifying agent is a difunctional hydroxy-containing modifying agent such as, but not limited to, ethylene glycol or cyclohexane dimethanol.

Preferred modifying agents also include both monofunctional and multifunctional polymeric modifying agents. Such polymeric modifying agents include both linear and branched polymeric modifying agents. Examples of polymeric modifying agents include polyesters, polyamides, polyethers, polyurethanes, polyacrylates, and polyorganosiloxanes, in addition to other polymers containing functional groups capable of reacting with the condensation reactive functionality on the radically-polymerizable monomer. Examples of polyether modifying agents include polyethylene glycol, polybutylene glycol, polypropylene glycol, and derivatives and combinations thereof. An incorporated polymeric modifying agent may constitute a significant proportion of the final mass of a polymeric product. For example, the polymeric modifying agent may constitute 5 to 90 weight percent of the final polymeric product. Incorporation of a polymeric modifying agent may also impart important properties to the final polymeric product such as flexibility, adhesion, and toughness. Polymeric products produced from polymeric modifying agents may have residual functionality and thus may be further reacted in a post polymerization reaction.

Generally, the polymeric product of the polymerization and condensation process may contain a mixture, in various proportions, of radically-polymerized polymer with branches of polymeric modifying agent extending from the chains (i.e. only one reactive group of the modifying agent has reacted), a cross-linked polymer where a multifunctional polymeric modifying agent forms cross-links between different chains of the radically-polymerizedpolymer, unreacted modifying agent, and chains of radically-polymerized polymer that do not contain any polymeric modifying agent. While it is not necessary that high conversion of the modifying agent be achieved by incorporation into the polymer, such high conversion is possible using the processes of the invention. Alternative processes of the invention provide a polymeric product where only some of the condensation reactive groups on the polymeric modifying agent react.

The radically-polymerizable monomer is fed into a primary reactor, and optionally, a portion of the monomer may be fed into subsequent reactors if a series of reactors is used. The modifying agent may be fed to either a primary reactor or into the secondary reactor in a process using two reactors, or into any subsequent reactor. Alternatively, the modifying agent may be fed to both the primary and the secondary reactors as well as any additional reactors. Both the monomer and the modifying agent may be added to the reactor by any means well known in the art, including but not limited to, dissolving the modifying agent in the feed mixture or feeding the modifying agent separately to the reactor as a solid or liquid by any means known to the art, including but not limited to melting and pumping and extrusion.

The reaction between the functional group on the modifying agent and the condensation reactive functionality on the radically-polymerizable monomer can occur in at least two ways. First, the modifying agent may react with the radically-polymerizable monomer before the latter has polymerized thus forming a new radically-polymerizable monomer already incorporating the modifying agent. Alternatively, the modifying agent may react with the condensation reactive functionality of the radically-polymerizable monomer after the radically-polymerizable monomer has been incorporated into the polymer. In one embodiment, the modifying agent is added only to a secondary reactor allowing the radically-polymerizable monomer to polymerize within the primary reactor.

Condensation reactions between the modifying agents and the condensation reactive functionalities on the radically-polymerizable monomers are generally slow compared to free radical polymerization reactions. Additionally, condensation reactions generally require high temperatures and long reaction times to achieve satisfactory incorporation of the modifying agent. Typically, however, an increase in the temperature of the reaction reduces the molecular weight of polymers formed by free radical polymerization due to an increase in the rate of chain initiation and an increase in the contribution of chain scission mechanisms. Thus, in typical radical polymerization reactions, the temperature may be increased to a point such that the molecular weight of the resulting polymeric product may be too low for its use in intended applications. However, incorporation of the multifunctional modifying agent in the polymer backbone increases the molecular weight of the polymeric product via cross linking and may be sufficient to counteract the drop in molecular weight due to the increase in temperature.

In preferred processes according to the invention, one or more radically-polymerizable monomers substantially free of condensation reactive functionalities is also added to the reaction zone. Examples of vinyl monomers include, but are not limited to, styrenic monomers also known as vinyl aromatic monomers. Preferred vinyl aromatic monomers include a-methylstyrene and styrene. Examples of other radically-polymerizable monomers substantially free of condensation reactive functionalities include t-butyl styrene, o-chlorostyrene, acrylonitrile, and mixtures thereof.

In preferred processes according to the invention, one or more radically-polymerizable monomers with more than one vinyl group is added to the reaction zone. These divinyl monomer may optionally contain condensation reactive functionalities. Examples of such monomers include, but are not limited to, divinyl benzene, 1,6-hexanediol diacrylate, and ethylene glycol dimethacrylate. It is well known to those skilled in the art that as the temperature of the free radical polymerization increases, the molecular weight of the polymer formed decreases. However, higher temperatures are often needed to achieve the desired incorporation of the modifying agent into the polymer. The use of divinyl species increases the molecular weight of the free radical polymer and therefore, can be an important tool, along with temperature, residence time, catalyst, and initiator, in achieving target polymer properties such as the backbone molecular weight and level of modifying agent incorporation.

In preferred processes, the radically-polymerizable monomer contains a carboxyl functionality and the modifying agent contains a hydroxy functional group. The reaction of the radically-polymerizable monomer and the modifying agent thus results in ester formation with the release of water as a byproduct. In more preferred processes, acrylic acid is used as the radically-polymerizable monomer and cyclohexanol is used as the modifying agent. The reaction of acrylic acid with cyclohexanol leads to the incorporation of cyclohexyl groups in the polymeric product which results in a coating product exhibiting superior weatherability characteristics. A weatherable coating is one that can retain gloss for a significantly longer period of time after exposure to sunlight or UV light. This is explained in greater detail in the following examples. Cyclohexyl acrylate can be purchased directly and incorporated into polymer products by free radical polymerization, but the cost of cyclohexyl acrylate is prohibitive compared to the cost of acrylic acid and cyclohexanol. The process described herein incorporates the cyclohexyl group in unexpectedly high levels using the inexpensive cyclohexanol and acrylic acid modifying agent and radically-polymerizable monomer. Another preferred process includes acrylic acid as the radically-polymerizable monomer and methylcyclohexyl methanol as the modifying agent. In another preferred process, butyl acrylate is used as the radically-polymerizable monomer and methylcyclohexyl methanol is used as the monofunctional modifying agent. Methylcyclohexyl methanol transesterifies with butyl acrylate to form an acrylate bond that incorporated the methylcyclohexyl methyl group into the polymer. Butanol is formed as a byproduct in this transesterification polymerization reaction.

Those skilled in the art will recognize that various combinations of radically-polymerizable monomers containing condensation reactive functionalities, monofunctional modifying agents, and radically-polymerizable monomers substantially free of condensation reactive groups may be used in desired proportions to obtain a polymer with desired properties and characteristics. For example, common charges to the primary polymerization reactor may include both styrene and α-methylstyrene in various proportions. Furthermore, combinations of acrylates and methacrylates may be used to tailor the composition, architecture of the product, and final properties of the polymer such as glass transition temperature. The use of acrylates and methacrylates allows for transesterification reactions with hydroxy-containing modifying agents. In one process of the invention, acrylic acid is supplied to reactor 100 with styrene, x-methylstyrene, methyl methacrylate, butyl acrylate and cyclohexanol along with an initiator, solvent, and a catalyst. In this process, the monofunctional modifying agent, cyclohexanol, may react with the carboxyl group on the acrylic acid and may also react with the ester groups on butyl acrylate and methyl methacrylate to form a polymeric product containing cyclohexl acrylate and cyclohexyl methacrylate residues. The reaction byproducts of the reaction of cyclohexanol with butyl acrylate and methyl methacrylate are respectively butanol and methanol. Thus, cyclohexyl groups may be incorporated into the polymer by multiple routes.

In alternative processes, at least two different radically-polymerizable monomers having one or more condensation reactive functionality are selected to obtain a polymeric polymer with desired properties. Generally, a mixture of these radically-polymerizable monomers are continuously supplied to the primary polymerization reactor. In this process, at least two different condensation reactive functionalities of the selected radically-polymerizable monomers react with each other to produce either a di-ethylenically unsaturated species, or a cross-link between two polymer chains.

Although the polymerization and condensation process may be conducted without the use of a solvent, optionally, an inert solvent is added to the reaction zone in any of the reactors. Any suitable non-reactive solvent may be used in the process. Non-reactive or inert solvents are solvents which do not contain functionalities which react with the condensation reaction functionality on the radically-polymerizable monomer or the functional group on the modifying agent. A reaction zone substantially free of any inert solvent can contain up to only about 2 percent (w/w) of any reaction solvent although the term generally refers to a reaction zone with less than this amount of solvent. Examples of suitable inert solvents include, but are not limited to, 1-methyl-2-pyrolidinone, acetone, methyl amyl ketone, Isopar® G, a commercial solvent available from Exxon Chemicals (Houston, Tex.), xylene, Aromatic 100™ and Aromatic 150™, commercial aromatic solvents available from Exxon Chemicals (Houston, Tex.), hexane, heptane, toluene, and diethylene glycol diethyl ether.

Although no catalysts are necessary in the polymerization and condensation process, various catalysts are preferably used in the process. For example, in preferred processes, one or more catalysts capable of promoting a reaction between the condensation reactive functionality of the monomer and the functional group of the modifying agent are supplied, preferably continuously, into one of the reactors. Preferred catalysts include esterification catalysts, transesterification catalysts, and amidation catalysts. These include organic titanates, organic tin compounds, antimony oxides, organic sulfonic acids, mineral acids, metal acetates, Lewis acids, and metal chlorides. Preferred catalysts include TYZOR® GBA, a titanate catalyst available from E.I. DuPont De Nemours & Co. (Wilmington, Del.), dibutyl tin oxide, $Sb_2O_3$, p-toluenesulfonic acid, methanesulfonic acid, $H_2SO_4$, $H_3PO_4$, manganese acetate, zinc acetate, dinonyl naphthalene disulfonic acid, hydrated monobutyltin oxide, and zirconium oxide. Side reactions may occur under some conditions and undesirable byproducts may form. Thus, the appropriate catalyst or groups of catalysts should be selected based on the reactants and reaction conditions.

Although not required in the polymerization and condensation process, various agents capable of reacting with a reaction byproduct may be added to the reaction zone. Such agents are also referred to as byproduct removal agents. Thus, the process may include continuously supplying into one of the reactors one or more byproduct removal agent capable of reacting with a condensation byproduct. For example, cyclohexene reacts with water to form cyclohexanol, and it may be fed into the reaction zone in quantities effective to remove some or substantially all of the water byproduct from a condensation reaction such as an esterification reaction.

Although not required, an initiator may also be added to the reaction zone in the polymerization and condensation process. Thus, the process preferably includes continuously supplying into a reactor, one or more radical polymerization initiators. Preferred initiators include peroxides such as di-t-butyl peroxide and di-t-amyl peroxide. Other suitable initiators include, but are not limited to, aliphatic azo compounds such as 1-t-amylazo-1-cyanocyclohexane, azobis-isobutyronitrile and 1-t-butylazo-1-cyanocyclohexane and peroxides and hydroperoxides, such as t-butylperoctoate, t-butyl perbenzoate, dicumyl peroxide, t-butyl hydroperoxide, and cumene hydroperoxide. Numerous continuous bulk polymerization process are known in the art. Included among these are U.S. Pat. Nos. 4,414,370, issued to Hamielec et al.; U.S. Pat. No. 4,529,787, issued to Schmidt et al; and U.S. Pat. No. 4,456,160, issued to Brand et al, the disclosures of all of which are hereby incorporated by reference. An example, non-limiting, apparatus is described as follows, with reference to FIGS. 1 and 2, with like numerals denoting like objects. The process includes continuously supplying into a primary reactor such as primary polymerization reactor 100 (FIG. 1), a mixture containing at least one radically-polymerizable monomer having a radically polymerizable group and also having at least one condensation reactive functionality together with at least one modifying agent with a functional group capable of reacting with the condensation reactive functionality on a radically-polymerizable monomer.

All modifying agents supplied to reactor 100 are supplied in amounts effective to achieve satisfactory incorporation of the modifying agent into the polymeric product, and thus for satisfactory conversion of the reaction components into the polymeric product. More than one modifying agent may be supplied to reactor 100 so that a combination of modifying agents is incorporated into the polymer product.

Additionally, one or more modifying agents may be supplied to a secondary reactor in the process. The high temperature continuous polymerization and condensation process includes the step of heating the mixture in the primary polymerization reactor 100 to an effective temperature for a period sufficient to obtain a polymeric product. At least a portion of the condensation reactive functionality reacts with the functional group of the modifying agent in the reaction zone such that the polymeric product incorporates at least some of the modifying agent.

Additionally, the effective temperature is maintained such that the polymeric product is formed substantially free of gelation. The effective temperature preferably ranges between about 175° C. to about 345° C. The average residence time period is preferably less than 60 minutes in the primary reactor, and more preferably ranges from about 2 to about 60 minutes in primary polymerization reactor 100. The primary reactor is optionally vented. Exemplary primary reactors include a loop reactor and a continuous stirred tank reactor. Preferably, however, the primary reactor is a continuous stirred tank reactor. The continuous stirred tank reactor or loop reactor are fitted with agitation systems such that the reactors are well mixed. The polymeric product of the primary reactor 100 is continuously removed from the reactor. The product may then be fed to another reactor or processed as the end product of the polymerization and condensation process.

Continuous stirred tank reactors, and loop reactors at high recycle ratio, have broad residence time distributions and, therefore, the extent that the modifying agent is incorporated in the polymeric product in the primary polymerization reactor may be heterogeneous compared to a conventional batch or semi-batch type process. Thus, unique polymeric structures can be produced in this continuous process previously not available in the art.

In other alternative processes, the temperature of the primary reactor 100 exceeds 300° C., and at least two radically-polymerizable monomers, each having a radically polymerizable group thereon and at least one condensation reactive functionality thereon, are supplied to the reactor in desired proportions. A modifying agent may additionally be supplied to the reaction zone in desired proportions. The radically-polymerizable monomers may react with each other to produce a di-ethylenically unsaturated species and impart a high level of cross-linking and/or branching in the polymeric product. One of the reasons gel formation is avoided is the high levels of chain cleavage by scission which occurs at the higher temperatures in the reaction zone. The polymeric product therefore has a high degree of branching. The polymers are known to exhibit improved theological properties over linear polymers of similar molecular weights prepared by other means.

In preferred processes, the average residence time in the reaction zone of primary reactor 100 is maintained in the range of 2 to 60 minutes. In general, in the absence of a modifying agent, longer residence times will result in lower molecular weight averages in the polymeric product. This is a result of the increased conversion of the monomer (and initiator) species and the complex interaction of the kinetic rates of chain initiation, chain propagation and chain cleavage by scission. The addition of a suitable modifying agent could, however, reverse this trend since condensation reactions are generally slower than free radical reactions and their impact on the molecular weight distribution is greatly enhanced as longer residence times are allowed.

Generally, increasing the temperature in reactions of this type results in an increase in the level of cross-linking of any given formula. The increased level of cross-linking usually increases the probability of gelation. However, unexpectedly, the chain cleavage process resulting from scission at higher temperatures tends to counteract that effect and thus delays the onset of gelation. Nevertheless, gelation may occur for some formulas if the temperature is increased above a certain limit. However, gelation behavior can be reversed if the temperature is further increased as chain cleavage begins to dominate and control the molecular weight of the polymeric product. Thus, gelation should be considered during any polymerization and condensation process.

In processes that have a potential to gel, gelation behavior in a batch or semi-batch process is different from that in continuous reactors because of the transient nature of continuous processes and the change in the concentration of the free radicals and monomer species. Hence, avoidance of gelation is much more difficult for batch reactors, and the process limits on composition and temperature are much tighter for the gel-free region. When a polymerizationand condensation process according to the present invention is conducted in a continuous reactor at a temperature above the higher temperature limit, a highly branched non-gelled polymer structure results.

Figure 2:
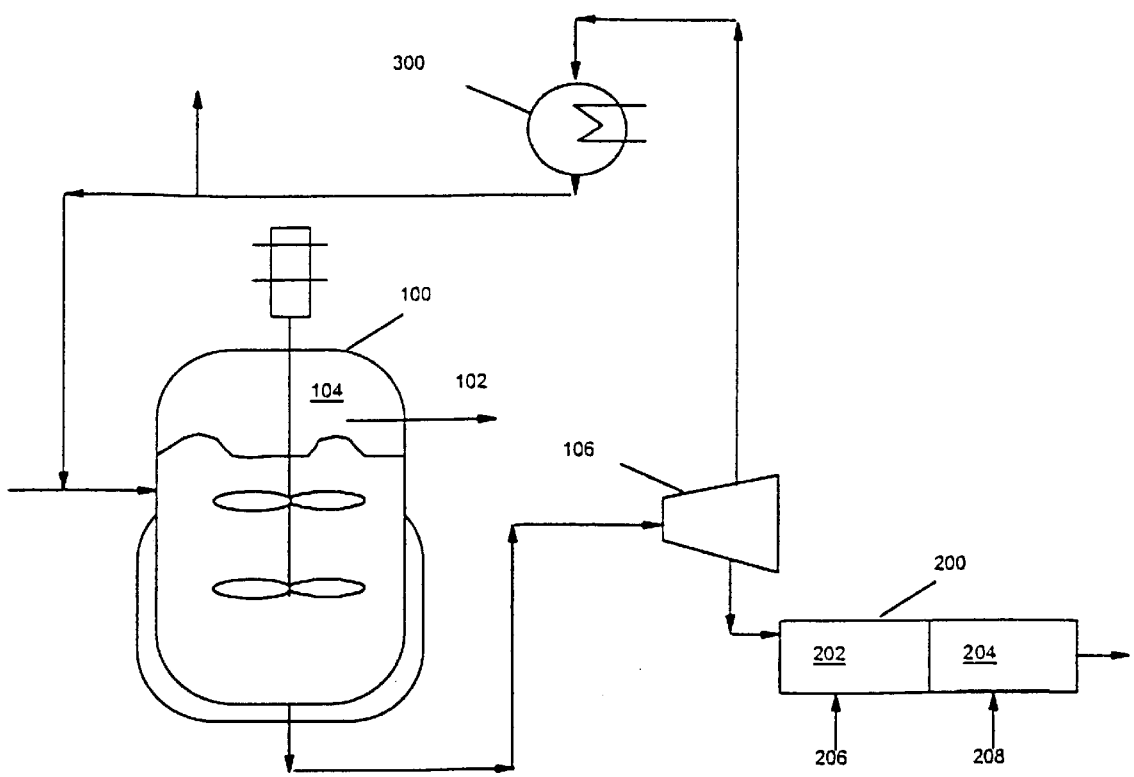
FIG. 2 is a schematic diagram of a polymerization reactor network utilized in the present invention having a conventional evaporator placed between the primary and secondary reactors.

A secondary reactor 200 may be used in the continuous polymerization and condensation process as shown in FIGS. 1 and 2. Such a secondary reactor is optionally, but preferably, vented. For example, a secondary reactor 200 may be used in series with the primary polymerization reactor 100. Exemplary secondary reactors include any reactors known in the art such as, but not limited to, loop reactors, tube reactors, extruders, and continuous stirred tank reactors or any other reactor suitable for continuous operation including combination of the above in series or parallel. FIG. 1 illustrates an exemplary secondary reactor 200 that is a tube reactor. The secondary tube reactor 200 has one or more zones such as zones 202 and 204 and may be equipped with static mixers. Zones 202 and 204 provide for variable individualized temperature control in each respective zone, and zones 202 and 204 also provide for individual different modifying agent feeds 206 and 208. Preferably, the temperature in the secondary reactor is maintained in the range of about 175° C. to about 345° C., more preferably above 300° C., and the flow rates are adjusted so that the effective time period in the secondary reactor ranges from about 2 to about 300 minutes.

In preferred polymerization and condensation processes, a portion of the modifying agent is added to the different zones 202 and 204 of the secondary reactor inlet 200 through feeds 206 and 208. Feeds 206 and 208 also facilitate the feed of one or more catalysts which can be fed to different zones 202 and 204 in secondary tube reactor 200 in different proportions. The addition of secondary reactor 200 is used to increase the overall residence time in the process, to increase the level of incorporation of the modifying agent, and to increase polymerization of the radically-polymerizable monomers including both those having condensation reactive functionalities and those substantially free of such functionalities. Any tube reactor used in the process preferably has one or more different polymerization reaction zones which allow for both individual temperature control and for individual different modifying agent feeds. The catalysts are optionally fed to the different zones in the tube and may be fed in different proportions. The secondary reactor 200 may be placed at various locations in the process of the current invention. For example, as shown in FIG. 1, a secondary reactor may be placed between primary reactor 100 and any devolatilizer known in the art such as conventional evaporator 106, such that the polymeric product from the primary reactor is fed into the secondary reactor without being passed through any devolatilizer. Alternatively, as illustrated in FIG. 2, the secondary reactor 200 may be placed after any devolatilizer such as conventional evaporator 106. Preferably, a devolatilizer, such as conventional evaporator 106 is placed after the secondary reactor 200 as shown in FIG. 1.

The conditions in primary reactor 100 may be set to achieve a required product composition and molecular weight with relatively little incorporation of the modifying agent, and the conditions of secondary reactor 200 may be adjusted to increase incorporation of the modifying agent. The modifying agent may be added to the feed mixture added to primary reactor 100 or optionally added after primary reactor 100 to the inlet 206 of secondary reactor 200.

This variant of the process permits an architecture shift in the structure of the polymer. Secondary reactor 200 is continuously charged with the product mixture from primary polymerization reactor 100. The effective temperature is controlled in both the primary polymerization reactor 100 and the secondary reactor 200. The optimal effective temperature in each reactor 100, 200 is selected to obtain the desired product properties. Optionally, a catalyst is provided in secondary (polymerization) reactor 200, and the temperature in the reactors is adjusted to manipulate the monomer sequence distribution of the polymer backbone to a desired distribution. The result of utilizing the process and apparatus is that the molecular weight and architecture of the resultant product is tailored to a desired configuration and molecular weight. Furthermore, a method of tailoring the architecture of the polymer chains by manipulating the reaction conditions of the primary reactor 100 and secondary reactor 200 is provided. The feed of the modifying agent is directed to primary reactor 100, secondary reactor 200, or both. A polymeric product produced from radically-polymerizable monomers that tend to produce polymers with long sequences of a given monomeric unit (i.e. polymers that tend to be blocky in nature), can be engineered to have a more random sequence length distribution with short sequences of each monomeric unit starting with inexpensive precursors such as a radically-polymerizable monomer and a modifying agent. This is possible because certain radically-polymerizable monomers having condensation reactive functionalities will polymerize with other monomers, such as vinyl aromatic monomers, in a more random fashion than would the monomer product prepared by the reaction between radically-polymerizable monomers and the modifying agent. Thus, polymers with a more random structure (I) may be selectively prepared where a polymer with a blockier structure (II) would otherwise result.

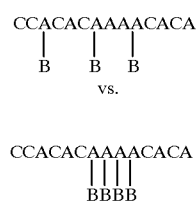

Examples of the structures are shown above where "A" represents a radically-polymerizable monomer with a condensation reactive functionality, "B" represents a modifying agent, and "C" represents a radically-polymerizable monomer without a condensation reactive functionality.

Furthermore, the polymeric product of the present invention has a substantially different chain architecture and/or microstructure than that of a similar polymeric product produced strictly from a free radical polymerization process.

In continuous polymerization and condensation processes which impart a more random structure to a polymeric product, a precursor to a monomer that conventionally tends to produce long sequences is reacted in the primary reactor along with the other monomers to produce a polymer with a random distribution of the monomeric units. In the secondary polymerization reactor, the modifying agent is incorporated by reaction with the condensation reactive groups on the precursor that has been polymerized in the polymer. Thus, polymers with short sequence length distributions of the monomeric units can be made in this process at the same overall composition whereas only polymers with longer sequence length distributions are possible using conventional methods.

Where a specific derivative of acrylic acid reacts less readily with styrene than acrylic acid does, reaction between the acrylic acid derivative and styrene would result in long chain length sequences of the acrylate monomer in the polymer, whereas reaction between acrylic acid and styrene would result in a more random distribution of chain length sequences. The continuous polymerization and condensation process allows the latter reaction to be conducted in the primary reactor, and the styrene/acrylic acid copolymer can then be functionalized to the acrylate equivalent by reaction with the modifying agent in the primary reactor and/or the secondary reactor to produce the acrylate/styrene polymer, but with fewer long chain length sequences. Because all the modifying agent may be added to the secondary reactor, it is possible to minimize formation of the acrylic acid ester derivative in the primary polymerization reactor. Thus, if the modifying agent is added to the secondary reactor, the majority of the modifying agent preferentially reacts with the condensation reactive functionalities on the polymeric product formed in the primary reactor. Thus, it is sometimes preferable to maximize incorporation of the modifying agent into the polymer in the second reactor of the process while minimizing it in the primary reactor. Depending on the selection of monomers, the choice of modifying agent, and the reaction conditions, the process may also be used to prepare a blocky polymeric product, whereas a more random polymer would ordinarily be produced by other methods.

Additional reactors may be used in the continuous polymerization and condensation process in various locations such as, but not limited to, following the primary and/or secondary reactor, and/or an intermediate devices such as a devolatilizer which acts to remove volatile materials from the polymeric product such as unreacted monomer, modifying agent and byproducts. These additional reactors may include a cascade of continuous stirred tanks, loop reactors, tubes, extruders, or plug-flow reactors in various combinations such as in parallel or in series.

The process preferably includes substantially removing unreacted monomer, reaction byproducts, inert solvent, and, optionally, unreacted modifying agent from the product mixture. This may be accomplished using a conventional evaporator 106 such that a substantially volatile-free polymeric product is obtained.

Reaction byproducts such as water from esterification or methanol from transesterification along with various side reactions, including the decomposition products of the initiator may be formed in primary polymerization reactor 100 and in secondary reactor 200. Furthermore, the reaction of the modifying agent with the condensation reactive functionality on the radically-polymerizable monomer may be reversible. Thus, the presence of byproducts in the reactor envirornent may limit the conversion of the modifying agent as known to those skilled in the art. Thus, the primary polymerization reactor 100, the secondary reactor 200, or both, preferably have a vapor head space 104. Typical reactors with vapor head spaces include continuous stirred tank reactors. The level of the liquid in the reactor is generally maintained at a constant level by withdrawing the polymeric product at the same mass rate as the feed is supplied to the reactor. A vapor phase rich in low boiling components is typically present above the level of the liquid. Substantial components of the vapor phase typically include low boiling byproducts, solvent, unreacted monomers, and unreacted modifying agent. Where reaction byproducts are formed, the process preferably includes continuously or intermittently purging the reaction byproducts from primary polymerization reactor 100 head space 104 to obtain a purge that escapes through purge line 102. The process also preferably includes purging the head space which may be present in secondary reactor 200. An inert material such as nitrogen is preferably used to purge the headspace of any reactor used in the continuous polymerization and condensation process to aid in the removal of the byproducts.

Unreacted monomer, reaction byproducts, inert solvent, and unreacted volatile modifying agent may be condensed and removed from the polymeric product of the primary reactor or the primary reactor itself. These materials may be condensed in condenser 300 to obtain a liquid stream which may then be charged into primary polymerization reactor 100. Unreacted monomer, reaction byproducts, inert solvent, and unreacted modifying agent may also be removed from the polymeric product of the secondary polymerization reactor or the secondary reactor by condensing the material in condenser 300 to obtain a liquid stream. This stream may then be charged into the primary polymerization reactor 100 or the secondary reactor 200.

Preferably, unreacted monomer, reaction byproducts, inert solvent, and unreacted modifying agent from the primary polymerization reactor 100 or secondary polymerization reactor 200 may be partially separated to obtain at least two streams such as by partial condensation, distillation, membrane separation, or centrifugation. More preferably, one of the streams is relatively free of reaction byproducts. The stream relatively free of reaction byproducts may be recycled to the primary polymerization reactor or optionally fed into the secondary polymerization reactor. Additionally, the vapor head space purge from the primary or secondary reactor may be mixed with unreacted monomer, reaction byproducts, inert solvent, and, optionally, unreacted modifying agent from the evaporator 106 and condensed together in the condenser 300.

Various products may be prepared using the polymeric product of the continuous polymerization and condensation process. Some of these include overprint varnishes, coatings, weatherable coatings, coating modifiers and compatibilizers, dispersants, polymer surfactants, and polymers for paints.

The following nonlimiting examples are included to further teach the present invention.

EXAMPLES

The following abbreviations are used in the Examples:

| | |
|---|---|
| 1,10-DD | 1,10-decanediol |
| 1,6-HD | 1,6-hexanediol |

-continued

| | |
|---|---|
| 2-EHA | 2-ethylhexyl acrylate |
| 2-EHAOH | 2-ethylhexanol |
| AA | Acrylic acid |
| AMS | α-Methylstyrene |
| AN | Acid Number |
| BA | Butyl acrylate |
| CHDA | 1,4-Cyclohexanedicarboxylic acid |
| CHOH | Cyclohexanol |
| CSTR | Continuous Stirred Tank Reactor |
| DEGMEE | diethylene glycol monoethyl ether |
| DEGMEEA | diethylene glycol monoethyl ether acrylate |
| DTBP | di-t-Butyl peroxide |
| BDA | Ethylene diamine |
| EG | Ethylene glycol |
| HEMA | Hydroxyethyl methacrylate |
| IPA | Isophthalic acid |
| IPDA | Isophorone diamine |
| MAK | Methyl amyl ketone |
| MCHM | 4-Methylcylohexyl methanol |
| MMA | Methyl methacrylate |
| $M_n$ | Number average molecular weight |
| $M_w$ | Weight average molecular weight |
| $M_z$ | z average molecular weight |
| NMP | N-methylpyrollidinone |
| NV | Non-Volatiles |
| PD | Polydispersity index = $(M_w/M_n)$ |
| PE | Polyester |
| TBHP | t-Butyl hydroperoxide |
| $T_g$ | Glass Transition Temperature |
| TMP | Trimethylolpropane |
| p-TSA | p-Toluenesulfonic acid |

General Polymer Characterization Methods

The materials and products described in the examples are characterized by a number of standard techniques. The molecular weight of polymeric products was determined via get permeation chromatography ("GPC") techniques using tetrahydrofuran ("THF") as eluent and poly(styrene) standards. The poly(styrene) standards employed are presently available from Polymer Laboratories Limited (Church Stretton, Great Britain) and are further characterized as having number average molecular weights of 2,250,000; 1,030,000; 570,000; 156,000; 66,000; 28,500; 9,200; 3,250; and 1,250. Hydroxy numbers were determined by reaction with acetic anhydride solution followed by titration with standard base. Acid numbers were determined by titration with standard base. Acid numbers are defined as the number of milligrams of potassium hydroxide needed to neutralize one gram of polymer. The hydroxy numbers are defined as number of millequivalents of potassium hydroxide needed to neutralize one gram of polymer.

Feed mixtures and unreacted volatile organic compounds were measured with gas chromatography (GC) using a Hewlett Packard DB-1 column. In some experiments, the concentration of carboxylic containing monomers or modifying gents were determined by titration with standard base.

Continuous High Temperature Polymerization Modified by Condensation with a Monofunctional Modifying Agent

Example 1

A reaction mixture of 5% styrene, 17.5% acrylic acid, 15% 2-ethylhexyl acrylate, 32.45% methyl methacrylate, 30% cyclohexanol and 0.05% di-tertiary butyl peroxide was continuously supplied to a reactor process similar to that described in FIG. 1, comprising a 3-gallon CSTR followed by a tube reaction zone of fixed volume, whereby each zone was maintained at a constant temperature. Reaction zone level and feed flow rate were adjusted to provide a residence time of 15 minutes in the primary reactor. The residence time in the tube reactor zone was 30 minutes. The temperature of the primary reactor was maintained at 204° C., while the temperature of the tube reaction zone was maintained at either 204° C., 232° C. or 246° C. The reaction product was continuously pumped to a devolatization zone, and the polymer product from the devolatization zone was continuously collected and later analyzed for molecular weight averages ($M_w$ and $M_n$) and acid number which indicates the level of functional carboxylic groups present on the polymer chains. The results of these reactions are presented in Table 1.

TABLE 1

| Tube Reaction Zone Temperature (° C.) | $M_n$ | $M_w$ | AN |
|---|---|---|---|
| 204 | 3,749 | 9,092 | 146.7 |
| 232 | 4,215 | 11,780 | 128.3 |
| 246 | 3,530 | 10,330 | 122.3 |

Example 2

The process of Example 1 was repeated except that the reaction zone level and feed flow rate were adjusted to provide a residence time of 30 minutes in the primary reactor. The resulting residence time in the tube reactor zone was 30 minutes. The temperature of the primary reactor was maintained at 204° C., while the temperature of the tube reaction zone was maintained at either 204° C. or 232° C. The reaction product was continuously pumped to a devolatization zone, and the polymer product from the devolatization zone was continuously collected and later analyzed for molecular weight averages ($M_w$ and $M_n$) and acid number which indicates the level of functional carboxylic groups present on the polymer chains. Results are presented in Table 2.

TABLE 2

| Tube Reaction Zone Temperature (° C.) | $M_n$ | $M_w$ | AN |
|---|---|---|---|
| 204 | 3,054 | 7,411 | 141.1 |
| 232 | 3,279 | 8,386 | 127.0 |

Example 3

A reaction mixture of 5% styrene, 17.5% acrylic acid, 15% 2-ethylhexyl acrylate, 32.45% methyl methacrylate, approximately 30% cyclohexanol (See Table 3), 0.05 % di-tertiary butyl peroxide and varying amounts of the esterification catalyst (p-toluenesulfonic acid) was continuously supplied to a reactor process similar to that described in FIG. 1, comprising only a 3-gallon CSTR maintained at a constant temperature. Reaction zone level and feed flow rate were adjusted to provide a residence time of 15 minutes in the reaction zone. The temperature of the reaction zone was maintained at 204° C. Three different levels of p-toluenesulfonic acid were added to the reaction mixture in amounts representing 0.0%, 0.1% and 0.2% (by weight) of the reaction mixture, respectively. The reaction product was continuously pumped to a devolatization zone, and the polymer product from the devolatization zone was continuously collected and later analyzed for molecular weight averages ($M_w$ and $M_n$) and acid number which indicates the level of functional carboxylic groups present on the polymer chains. The results of these reactions are presented in Table 3.

TABLE 3

| % (w/w) p-TSA in Feed | % (w/w) Cyclohexanol in Feed | $M_n$ | $M_w$ | AN |
|---|---|---|---|---|
| 0.0 | 30.0 | 3,405 | 8,349 | 159.0 |
| 0.1 | 29.9 | 3,398 | 8,744 | 140.4 |
| 0.2 | 29.8 | 3,157 | 8,304 | 137.2 |

Example 4

A reaction mixture of 7.5% styrene, 15% acrylic acid, 17.5% butyl acrylate, 9.95% methyl methacrylate, 50% cyclohexanol and 0.05% di-tertiary butyl peroxide was continuously supplied to a reactor process similar to that described in FIG. 1, comprising a 3-gallon CSTR followed by a tube reaction zone of fixed volume and each zone was maintained at a constant temperature. Reaction zone level and feed flow rate were adjusted to provide a residence time of 15 minutes in the CSTR. When utilized, the resulting residence time in the tube reactor zone was 18.75 minutes. The temperature of the CSTR was maintained at either 220° C. or 245° C. The temperature of the tube reaction zone was maintained at 230° C. when it was employed. The reaction product was continuously pumped to a devolatization zone, and the polymer product from the devolatization zone was continuously collected and later analyzed for molecular weight averages ($M_w$ and $M_n$), and Acid Number which indicates the level of functional carboxylic acid groups present on the polymer chains. The results of these reactions are presented in Table 4.

TABLE 4

| CSTR Temperature (° C.) | Tube Reaction Zone Temperature (° C.) | $M_n$ | $M_w$ | AN |
|---|---|---|---|---|
| 220 | Not utilized | 1,863 | 3,524 | 161.0 |
| 220 | 230 | 1,954 | 3,980 | 134.9 |
| 245 | Not utilized | 1,138 | 1,802 | 139.0 |
| 245 | 230 | 1,323 | 2,235 | 121.0 |

Example 5

A reaction mixture of 10.5% styrene, 21% acrylic acid, 24.50% butyl acrylate, 13.96% methyl methacrylate, 30% cyclohexanol and 0.05% di-tertiary butyl peroxide was continuously supplied to a reactor process similar to that described in FIG. 1, comprising a 3-gallon CSTR followed by a tube reaction zone of fixed volume, and each zone was maintained at a constant temperature. Reaction zone level and feed flow rate were adjusted to provide a residence time of 15 minutes in the CSTR. When utilized, the resulting residence time in the tube reactor zone was 18.75 minutes. The temperature of the CSTR was maintained at 245° C. The temperature of the tube reaction zone was maintained at 230° C. when it was employed. The reaction product was continuously pumped to a devolatization zone, and the polymer product from the devolatization zone was continuously collected and later analyzed for molecular weight averages ($M_w$ and $M_n$), and Acid Number representing the level of functional carboxylic groups present on the polymer chains. The results of these reactions are presented in Table 5.

TABLE 5

| CSTR Temperature (° C.) | Tube Reaction Zone Temperature (° C.) | $M_n$ | $M_w$ | AN |
|---|---|---|---|---|
| 245 | Not utilized | 1,830 | 3,661 | 141.6 |
| 245 | 230 | 1,593 | 2,886 | 132.8 |

Example 6

The process of Example 3 was repeated except that the reaction zone level and feed flow rate were adjusted to provide a residence time of 15 minutes in the reaction zone, and the temperature of the reaction zone was maintained at 232° C. Two different levels of p-toluenesulfonic acid were added to the reaction mixture in amounts representing 0.1% and 0.2% (by weight) of the reaction mixture, respectively. The reaction product was continuously pumped to a devolatization zone, and the polymer product from the devolatization zone was continuously collected and later analyzed for molecular weight averages ($M_w$ and $M_n$) and acid number which indicates the level of functional carboxylic groups present on the polymer chains. The results of these reactions are presented in Table 6.

TABLE 6

| % (w/w) p-TSA in Feed | % (w/w) Cyclohexanol in Feed | $M_n$ | $M_w$ | AN |
|---|---|---|---|---|
| 0.1 | 29.9 | 1,819 | 3,959 | 133.6 |
| 0.2 | 29.8 | 1,759 | 3,739 | 144.8 |

Example 7

The process of Example 6 was repeated except that no p-toluenesulfonic acid was added to the reaction mixture, and the temperature of the reaction zone was maintained at 246° C. The reaction product was continuously pumped to a devolatization zone, and the polymer product from the devolatization zone was continuously collected and later analyzed for molecular weight averages ($M_w$ and $M_n$) and acid number which indicates the level of functional carboxylic groups present on the polymer chains. The polymer product had a $M_n$ of 1,561, a $M_w$ of 2,780 and an acid number of 144.

Example 8

A reaction mixture of 14.39% styrene, 14.39% hydroxyethyl methacrylate, 28.52% butyl acrylate, 21.45 % 4-methylcyclohexyl methanol, 21 % methyl amyl ketone, and 0.25 % di-t-butyl peroxide was continuously passed through a 500 mL CSTR maintained at a constant temperature of 232° C. or 249° C. Feed flow rate was adjusted to provide a residence time of 12 minutes. The reaction product was continuously stripped of volatile organic compounds, collected, and later analyzed for molecular weight averages ($M_w$ and $M_n$) and polydispersity (PD). The volatile organic compounds were analyzed by gas chromatography. The amount of 4-methylcyclohexyl methanol incorporated into the polymer by transesterification was computed by a process mass balance and indicated by conversion. Results are presented in Table 7.

TABLE 7

| Formula | Temp. (° C.) | $M_n$ | $M_w$ | PD | Conversion of MCHM into Polymer (%) |
|---|---|---|---|---|---|
| 8a | 232 | 1,449 | 2,408 | 1.66 | 11.5 |
| 8b | 249 | 1,165 | 1,785 | 1.53 | 14.2 |

The above experiment was repeated at 232° C. with the same formulation with the exception that the methyl amyl ketone was reduced to 20% and 1 % of a transesterification catalyst, tetraisopropoxy titanate (Tyzor® TPT, available from E.I. DuPont De Nemours & Co. (Wilmington, Del.), was added to the monomer mixture. Results are shown in Table 8. This example shows that polymer chain extension is obtained from the reaction of the pendant hydroxyethyl groups with the butyl or hydroxyethyl ester of an adjacent polymer chain which results in the formation of cross-links. This example also shows that the use of an esterification catalyst increases the incorporation of alcohol into the polymer by transesterification.

TABLE 8

| Temperature (° C.) | $M_n$ | $M_w$ | PD | Conversion of MCHM into Polymer (%) |
|---|---|---|---|---|
| 232 | 2,202 | 10,950 | 5.414 | 46.7 |

Example 9

A reaction mixture of 29.78% styrene, 28.52% butyl acrylate, 21.45% 4-methylcyclohexane methanol, 20% methyl amyl ketone and 0.25% di-t-butyl peroxide was continuously passed through a 500 mL CSTR maintained at a constant temperature of 232° C. or 249° C. Feed flow rate was adjusted to provide a residence time of 12 minutes. The reaction product was continuously stripped of volatile organic compounds, collected, and later analyzed for molecular weight averages ($M_w$ and $M_n$) and polydispersity (PD). The volatile organic compounds were analyzed by gas chromatography. The amount of 4-methylcyclohexane methanol incorporated into the polymer by transesterification was computed by a process mass balance and indicated by conversion. The above experiments were repeated with the same formulation with the exception that the methyl amyl ketone level was reduced to 20% and 1% of a transesterification catalyst: tetraisopropoxy titanate (Tyzor® TPT) was added to the monomer mixture. Results are presented in Table 9.

TABLE 9

| Formula | Temperature (° C.) | TPT (%) | $M_n$ | $M_w$ | PD | Conversion of MCHM into Polymer (%) |
|---|---|---|---|---|---|---|
| 9a | 232 | 0 | 1,718 | 3,547 | 2.06 | 10.4 |
| 9b | 232 | 1 | 1,738 | 3,747 | 2.16 | 41.9 |
| 9c | 249 | 0 | 1,221 | 2,167 | 1.77 | 10.9 |
| 9d | 249 | 1 | 1,238 | 2,248 | 1.82 | 40.2 |

Example 10

A reaction mixture of 9.2% styrene, 9% 2-ethylhexyl acrylate, 15.2% acrylic acid, 33.85% methyl methacrylate (33.60% when 0.25% p-TSA used), 31.5% 4-methylcyclohexyl methanol, and 0.25 % di-t-butyl peroxide was continuously passed through a 500 mL CSTR maintained at a constant temperature of 193° C. or 204° C. Another variable in this experiment was the addition of 0.25% p-toluenesulfonic acid based on the total feed weight. Reaction zone level and feed flow rate were adjusted to provide a residence time of 12 minutes. The reaction product was continuously stripped of volatile organic compounds, collected, and later analyzed for molecular weight averages ($M_w$ and $M_n$) and acid number which indicates the level of functional carboxylic groups present on the polymer chains. The analysis indicates the formation of an intermediate molecular weight polymer with molecular weights and acid functionality that vary depending on the presence of catalyst and the temperature of the reaction zone. Results are presented in Table 10.

TABLE 10

| Temperature (° C.) and Conditions | $M_n$ | $M_w$ | AN |
|---|---|---|---|
| 193-no catalyst | 3,164 | 9,610 | 138.9 |
| 204-no catalyst | 2,400 | 6,253 | 134.9 |
| 193-catalyst | 3,085 | 10,490 | 87.3 |
| 204-catalyst | 2,335 | 6,727 | 82.4 |

Example 11

A reaction mixture of 11% isobutyl acrylate, 20.5% acrylic acid, 26.5% methyl methacrylate (26.25 % when 0.25 % p-TSA used), 41.55 % 4-methylcyclohexyl methanol, and 0.45 % di-t-butyl peroxide was continuously passed through a 500 mL CSTR maintained at a constant temperature of 193° C. or 204° C. Another variable in this experiment was the addition of 0.25% p-toluenesulfonic acid based on the total feed weight. Reaction zone level and feed flow rate were adjusted to provide a residence time of 12 minutes. The reaction product was continuously stripped of volatile organic compounds, collected, and later analyzed for molecular weight averages ($M_w$ and $M_n$) and acid number which indicates the level of functional carboxylic groups present on the polymer chains. The analysis indicates the formation of an intermediate molecular weight polymer with molecular weights and acid functionality that vary depending on the presence of catalyst and the temperature of the reaction zone. Results are presented in Table 11. The conversion to ester is significantly higher with the p-TSA present.

TABLE 11

| Temperature (° C.) and Conditions | $M_n$ | $M_w$ | AN |
|---|---|---|---|
| 193-no catalyst | 2,272 | 6,158 | 190.1 |
| 204-no catalyst | 1,820 | 4,208 | 176.2 |
| 193-catalyst | 3,364 | 10,470 | 104.4 |
| 204-catalyst | 2,702 | 7,002 | 99.8 |

Example 12

A feed mixture of 9.2% styrene, 9% 2-ethylhexyl acrylate, 15.2% acrylic acid, 33.85 % methyl methacrylate, 31.5 % 4-methylccylohexyl methanol and 0.25 % di-t-butyl peroxide was continuously supplied to a reactor process similar to that described in FIG. 1, comprising a 3-gallon CSTR followed by a tube reaction zone, and each zone was maintained at a constant temperature. Reaction zone level and feed flow rate were adjusted to provide a residence time of 12 minutes in the CSTR. The resulting residence time in the tube reactor was 20 minutes. The temperature in the CSTR was maintained at 199° C., and the temperature in the tube reactor was maintained at either 218° C. or 246° C. The reaction product was continuously pumped to a devolatization zone, and the polymeric product from the devolatization zone was continuously collected and later analyzed for molecular weight averages ($M_w$ and $M_n$) and acid number which indicates level of functional carboxylic acid groups present on the polymer chain. The analysis shows that acid functionality depends on the temperature of the tube reactor. Results are presented in Table 12. The increased tube temperature significantly decreased the acid number indicating a higher level of ester formation.

TABLE 12

| Tube Temperature (° C.) | $M_n$ | $M_w$ | AN |
|---|---|---|---|
| 218 | 2,359 | 7,435 | 91.3 |
| 246 | 2,193 | 7,027 | 84.6 |

Example 13

A feed mixture of 11% butyl acrylate, 20.5% acrylic acid, 26.5% methyl methacrylate, 41.55% 4-methylcylohexyl methanol, and 0.45% di-t-butyl peroxide was continuously supplied to a reactor process similar to that described in FIG. 1, comprising a 3-gallon CSTR followed by a tube reactor. The temperature of each reactor was maintained at a constant temperature. Reaction zone level and feed flow rate were adjusted to provide a residence time of 12 minutes in the CSTR. The resulting residence time in the tube reactor was 20 minutes. The temperature in the CSTR was maintained at 204° C., and the temperature in the tube reactor was maintained at either 218° C. or 246° C. There action product was continuously pumped to a devolatization zone, and the polymeric product from the devolatization zone was continuously collected and later analyzed for molecular weight averages ($M_w$ and $M_n$) and acid number which indicates the level of functional carboxylic groups present on the polymer chains. The analysis shows that acid functionality depends on the temperature of the tube reactor. Results are presented in Table 13. The increased tube temperature significantly decreases the acid number indicating a higher level of ester formation.

TABLE 13

| Tube Temperature (° C.) | $M_n$ | $M_w$ | AN |
|---|---|---|---|
| 218 | 2,113 | 4,809 | 126.5 |
| 246 | 1,881 | 4,400 | 100.7 |

Example 14

This example shows the utility of the process of this invention by demonstrating the difficulty in post modification of resins with a modifying agent. Comparison with example 1 shows much lower incorporation of the modify ing agent with batch ampoule experiments compared to that obtained with the process of Example 1. A number of mixtures of different formula compositions comprising an acrylic polymer, a solvent, a monofunctional modifying agent and an esterification catalyst were prepared. In each formula the acrylic polymer utilized was a styrene/α-methylstyrene/acrylic acid terpolymer of acid number 244 and a $M_n$ of 1,130. Each formula was prepared by dissolving 10 grams of the acrylic polymer in 23 grams of the solvent, followed by the addition of a monofunctional modifying agent selected from the group of cyclohexanol and 4-methylcyclohexyl methanol, and the addition of an esterification catalyst selected from the group of p-TSA, $H_3PO_4$, $Mn(Ac)_2$, and $Zn(Ac)_2$. The amounts of monofunctional modifying agent and esterification catalyst utilized for each formula are specified in Table 14. When the catalyst was either p-TSA, or $H_3PO_4$, the solvent utilized was MAK, whereas otherwise the solvent utilized was NMP.

TABLE 14

| Formula | CHOH (grams) | MCHM (grams) | p-TSA (grams) | $H_3PO_4$ (grams) | $Mn(Ac)_2$ (grams) | $Zn(Ac)_2$ (grams) |
|---|---|---|---|---|---|---|
| 14a | 2.25 | — | — | .018 | — | — |
| 14b | 2.25 | — | — | .055 | — | — |
| 14c | 2.25 | — | .018 | — | — | — |
| 14d | 2.25 | — | .055 | — | — | — |
| 14e | — | 2.8 | .018 | — | — | — |
| 14f | — | 2.8 | .055 | — | — | — |
| 14g | — | 2.8 | — | .018 | — | — |
| 14h | — | 2.8 | — | .055 | — | — |
| 14i | 2.21 | — | — | — | .055 | — |
| 14j | 2.21 | — | — | — | .012 | — |
| 14k | 2.21 | — | — | — | — | .052 |
| 14l | 2.21 | — | — | — | — | .012 |
| 14m | — | 2.85 | — | — | .051 | — |
| 14n | — | 2.85 | — | — | .018 | — |
| 14o | — | 2.95 | — | — | — | .057 |
| 14p | — | 2.85 | — | — | — | .019 |

Two grams of each formula were added to each of two ampoules. These ampoules were sealed under vacuum after three freeze-thaw-degassing cycles. The ampoules were heated in an oil bath for a period of 60 minutes at a constant temperature of 200° C. The ampoules were subsequently removed from the oil bath, quenched, and evaluated for acid number, water content by Karl Fisher methodology, and residuals by gas chromatography. The results are outlined in Table 15. The formation of a cyclohexene byproduct was detected in some formulas.

TABLE 15

| Formula | Acid Number Initial | Acid Number Final | % CHOH (w/w) Initial | % CHOH (w/w) Final | % MCHM (w/w) Initial | % MCHM (w/w) Final | % Cyclo-hexene (w/w) |
|---|---|---|---|---|---|---|---|
| 14a | 73.2 | 71.0 | 6.3 | 6.3 | — | — | 0 |
| 14b | 75.9 | 71.4 | 6.4 | 6.2 | — | — | 0 |
| 14c | 76.1 | 67.5 | 6.1 | 4.9 | — | — | 0.6 |
| 14d | 71.7 | 65.3 | 5.8 | 3.1 | — | — | 1.3 |
| 14e | 68.6 | 61.1 | — | — | 6.6 | 5.3 | 0 |
| 14f | 64.7 | 56.7 | — | — | 5.5 | 4.0 | 0 |
| 14g | 71.7 | 66.8 | — | — | 7.6 | 5.9 | 0 |
| 14h | 73.2 | 67.8 | — | — | 7.5 | 5.5 | 0 |
| 14i | 72.5 | 72.2 | 6.1 | 5.6 | — | — | 0 |
| 14j | 71.0 | 71.0 | 6.3 | 5.8 | — | — | 0 |
| 14k | 72.7 | 72.3 | 6.1 | 5.9 | — | — | 0 |
| 14l | 72.3 | 72.3 | 6.5 | 5.8 | — | — | 0 |
| 14m | 71.1 | 70.5 | — | — | 7.4 | 6.7 | 0 |
| 14n | 69.5 | 69.5 | — | — | 7.3 | 6.9 | 0 |
| 14o | 72.1 | 70.8 | — | — | 7.4 | 6.7 | 0 |
| 14p | 71.8 | 71.8 | — | — | 7.4 | 6.8 | 0 |

Example 15

A reaction mixture of 49% styrene, 21% acrylic acid, 30% NMP and 0.25 % di-t-butyl peroxide is continuously passed through a 500 mL CSTR and maintained at a constant temperature of 232° C. Reaction zone level and feed flow rate are adjusted to provide a residence time of 12 minutes. The reaction product is continuously stripped of volatile organic compounds, collected, and later analyzed for molecular weight averages (M. and Mn) and acid number which indicates the level of functional carboxylic groups present on the polymer chains.

Example 16

A reaction mixture is prepared by adding 34% (by weight) octylamine or cyclohexylamine to the monomer mixture of Example 15. The resulting mixture is continuously passed through a 500 mL CSTR maintained at either 218° C. or 232° C. Reaction zone level and feed flow rate are adjusted to provide a residence time of 12 minutes. The reaction product is continuously stripped of volatile organic compounds, collected, and later analyzed for molecular weight averages ($M_w$ and $M_n$) and acid number which indicates the level of unreacted functional carboxylic groups remaining on the polymer chains. It will be found that the molecular weight of the polymer increases as the pendant carboxylic groups react with the amine reagent.

Example 17

A reaction mixture of styrene, alpha methyl styrene, acrylic acid, diethylene glycol monoethyl ether, xylene, and di-tertiary butyl peroxide (Table 16) was continuously supplied to a reactor process similar to that described in FIG. 1, comprising a 3-gallon CSTR followed by a tube reaction zone of fixed volume, and each zone was maintained at a constant temperature. Reaction zone level and feed flow rate were adjusted to provide a residence time of 12 minutes in the CSTR. The resulting residence time in the tube reactor zone was 15 minutes. The temperature of the CSTR was maintained at 193° C., 199° C., or 204° C. The temperature of the tube reactor was maintained at 260° C. The reaction product was continuously pumped to a devolatization zone, and the polymer product from the devolatization zone was continuously collected and later analyzed for molecular weight averages ($M_w$ and $M_n$), and Acid Number representing the level of functional carboxylic groups present on the polymer chains. The wt. % diethylene glycol monoethyl ether acrylate was computed by a process mass balance. The results of these reactions are presented in Table 17.

TABLE 16

| Feed (% w/w) | 17a | 17b | 17c | 17d | 17e | 17f | 17g | 17h | 17i |
|---|---|---|---|---|---|---|---|---|---|
| Styrene | 25.16 | 25.16 | 25.16 | 25.16 | 21.18 | 21.18 | 21.18 | 21.18 | 23.14 |
| AMS | 20.27 | 20.27 | 20.27 | 20.27 | 17.27 | 17.27 | 17.27 | 17.27 | 18.80 |
| AA | 24.47 | 24.47 | 24.47 | 24.47 | 31.46 | 31.46 | 31.46 | 31.46 | 27.96 |
| DEGMEE | 20 | 20 | 30 | 30 | 20 | 20 | 30 | 30 | 25 |
| Xylene | 10 | 10 | 0 | 0 | 10 | 10 | 0 | 0 | 5 |
| DTBP | 0.1 | 0.1 | 0.1 | 0.1 | 0.1 | 0.1 | 0.1 | 0.1 | 0.1 |

TABLE 17

| Polymer Property | 17a | 17b | 17c | 17d | 17e | 17f | 17g | 17h | 17i |
|---|---|---|---|---|---|---|---|---|---|
| $M_n$ | 3,220 | 3,440 | 3,110 | 3,290 | 3,590 | 3,970 | 3,530 | 3,880 | 3,690 |
| $M_w$ | 14,800 | 19,850 | 16,180 | 21,610 | 17,560 | 26,080 | 18,230 | 29,900 | 19,230 |
| AN | 175.1 | 177.8 | 161.4 | 164.3 | 203.9 | 204.4 | 186.6 | 190.0 | 182.5 |
| DEGMEEA (% w/w) | 11.8 | 12.8 | 16.9 | 15.5 | 16.1 | 16.2 | 20.0 | 19.3 | 17.2 |

Example 18

A reaction mixture is prepared by adding varying levels of Cardura® E, an organic epoxy compound available from Shell Oil (New York, N.Y.) to the monomer mixture of Example 15. The resulting mixture is continuously passed through a 500 mL agitated reaction zone maintained at 218° C. Reaction zone level and feed flow rate are adjusted to provide a residence time of 12 minutes. The reaction product is continuously collected and later analyzed for molecular weight averages ($M_w$ and $M_n$) and acid number which indicates the level of unreacted functional carboxylic groups remaining on the polymer chains. The analysis reveals that as the Cardura® E level in the formula is increased, an increase in molecular weight is observed and is accompanied by a decrease in acid number. This indicates that polymer chain grafting is obtained from the reaction of the pendant carboxylic groups with the epoxy reagent, which results in the formation of grafts.

Continuous High Temperature Polymerization Modified by Condensation with a Multifunctional Non-Polymeric Modifying Agent Example 19

A reaction mixture of 28 % styrene, 34% acrylic acid and 38% α-methylstyrene monomers was continuously passed through a 400 mL CSTR maintained at a constant temperature. Feed flow rate was adjusted to provide a residence time of 12 minutes. No inert solvent or initiator was used in this experiment. The reaction product was continuously collected and later analyzed for molecular weight averages (M, and Mn) and acid number which indicates the level of functional carboxylic groups present on the polymer chains. The analysis indicates the formation of an intermediate molecular weight polymer with molecular weights and acid functionality that vary depending on the temperature of the reaction zone. Results are presented in Table 18.

TABLE 18

| Temperature (° C.) | $M_n$ | $M_w$ | PD | AN |
|---|---|---|---|---|
| 271 | 1,056 | 2,077 | 1.97 | 244 |
| 282 | 935 | 1,567 | 1.7 | 237 |
| 293 | 720 | 1,065 | 1.5 | 241 |
| 314 | 551 | 705 | 1.28 | 225 |

Example 20

A feed mixture was prepared by mixing styrene, a-methylstyrene, acrylic acid, and ethylene glycol according to the compositions shown in Table 19. The resulting mixture was continuously passed through a 400 mL CSTR maintained at 271° C. Feed flow rate was adjusted to provide a residence time of 12 minutes. No inert solvent or peroxide initiator was used in this experiment. The reaction product was continuously collected and later analyzed for molecular weight averages ($M_w$ and $M_n$) and acid number which indicates the level of unreacted functional carboxylic groups remaining on the polymer chains. The analysis reveals that as the ethylene glycol level in the formula is increased, an increase in molecular weight is observed and is accompanied by a decrease in acid number. This indicates that polymer chain extension is obtained from the reaction of the pendant carboxylic groups with the glycol reagent, which results in the formation of cross-links. Slight broadening of the molecular weight distributions is observed as evidenced by the polydispersity index. Results are presented in Table 19.

TABLE 19

| | 20a | 20b | 20c |
|---|---|---|---|
| Feed Composition (% w/w) | | | |
| Styrene | 28.19 | 27.9 | 27.61 |
| AA | 33.39 | 33.06 | 32.71 |
| AMS | 37.42 | 37.04 | 36.66 |
| EG | 1 | 2 | 3 |
| Product Property | | | |
| $M_n$ | 1,244 | 1,291 | 1,391 |
| $M_w$ | 3,400 | 4,050 | 5,770 |

TABLE 19-continued

|  | 20a | 20b | 20c |
|---|---|---|---|
| PD | 2.73 | 3.1 | 4.1 |
| AN | 236 | 220 | 208 |

Example 21

Reaction mixtures described in Table 20 including styrene, α-methylstyrene, acrylic acid and ethylene glycol were continuously passed through a 400 mL CSTR maintained at a constant temperature of 282° C. Feed flow rate was adjusted to provide a residence time of 12 minutes. No inert solvent or peroxide initiator was used in this experiment. The reaction product was continuously stripped of volatile organic compounds, collected, and later analyzed for molecular weight averages ($M_w$ and $M_n$), polydispersity (PD) and acid number which indicates the level of functional carboxylic acid groups present on the polymer chains. Results are presented in Table 20.

TABLE 20

|  | 21a | 21b | 21c |
|---|---|---|---|
| Feed Composition (% w/w) | | | |
| Styrene | 28.19 | 27.9 | 27.61 |
| AA | 33.39 | 33.06 | 32.71 |
| AMS | 37.42 | 37.04 | 36.66 |
| EG | 1 | 2 | 3 |
| Product Property | | | |
| $M_n$ | 1,163 | 1,175 | 1,138 |
| $M_w$ | 2,436 | 3,107 | 3,848 |
| PD | 2.1 | 2.6 | 3.4 |
| AN | 228 | 206 | 200 |

Example 21

Reaction mixtures described in Table 21 including styrene, α-methylstyrene, acrylic acid and ethylene glycol were continuously passed through a 400 mL CSTR maintained at a constant temperature of either 293° C. or 296° C. Feed flow rate was adjusted to provide a residence time of 12 minutes. No inert solvent or peroxide initiator was used in this experiment. The reaction product was continuously stripped of volatile organic compounds, collected, and later analyzed for molecular weight averages ($M_w$ and $M_n$), polydispersity (PD) and acid number which indicates the level of functional carboxylic acid groups present on the polymer chains. Results are presented in Table 21. The analysis reveals that as the ethylene glycol level in the formula is increased, an increase in molecular weight is observed and is accompanied by a decrease in acid number. This indicates that polymer chain extension is obtained from the reaction of the pendant carboxylic acid groups with the glycol reagent which results in the formation of cross-links. Broadening of the molecular weight distributions is observed as evidence by the polydispersity index. It was observed that the use of ethylene glycol level higher than 8% (w/w) could result in gel formation in the reactor at the reaction zone temperature utilized in this example, as shown by the large increase in PD for the last run of Table 21.

TABLE 21

|  | 22a | 22b | 22c | 22d | 22e | 22f | 22g | 22h |
|---|---|---|---|---|---|---|---|---|
| Feed Composition (% w/w) | | | | | | | | |
| Styrene | 28.19 | 27.90 | 27.61 | 27.33 | 27.05 | 26.76 | 26.47 | 26.19 |
| AA | 33.39 | 33.06 | 32.71 | 36.29 | 35.91 | 35.53 | 35.15 | 34.77 |
| AMS | 37.61 | 37.04 | 36.66 | 32.38 | 32.04 | 31.70 | 31.36 | 31.03 |
| EG | 1 | 2 | 3 | 4 | 5 | 6 | 7 | 8 |
| Temp. (° C.) | 293 | 293 | 293 | 296 | 296 | 296 | 296 | 296 |
| Product Property | | | | | | | | |
| $M_n$ | 781 | 857 | 946 | 933 | 1,006 | 1,115 | 1,243 | 1,629 |
| $M_w$ | 1,307 | 1,702 | 2,256 | 2,355 | 2,987 | 4,426 | 7,174 | 71,130 |
| PD | 1.7 | 2.0 | 2.4 | 2.5 | 3.0 | 4.0 | 5.8 | 44.0 |
| AN | 226 | 209 | 191 | 179 | 163 | 148 | 131 | 114 |

Example 23

Reaction mixtures described in Table 22 including styrene, α-methylstyrene, acrylic acid and ethylene glycol were continuously passed through a 400 mL CSTR maintained at a constant temperature of 314° C. Feed flow rate was adjusted to provide a residence time of 12 minutes. No inert solvent or peroxide initiator used in this experiment. The reaction product was continuously removed from the reactor, collected, and later analyzed for molecular weight averages ($M_w$ and $M_n$), polydispersity (PD) and Acid Number which indicates the level of functional carboxylic acid groups present on the polymer chains. Results are presented in Table 22. The analysis revealed an increase in molecular weight accompanied by a decrease in acid number over a similar polymer product prepared in the absence of ethylene glycol. This indicates that polymer chain extension is obtained from the reaction of the pendant carboxylic groups with the glycol reagent which results in the formation of cross-links. Since no gel was observed, comparison to the formulas of Example 22 illustrates the effect of chain cleavage by scission, which allows the use of higher levels of EG as the temperature is increased.

TABLE 22

|  | 23a | 23b | 23c |
|---|---|---|---|
| Feed Composition (% w/w) | | | |
| Styrene | 27.61 | 26.47 | 25.62 |
| AA | 32.71 | 35.15 | 34.02 |
| AMS | 36.66 | 31.36 | 30.35 |
| EG | 3 | 7 | 10 |
| Temp. (° C.) | 314 | 314 | 314 |
| Product Property | | | |
| $M_n$ | 669 | 908 | 1,237 |
| $M_w$ | 1,070 | 2,700 | 7,462 |
| PD | 1.6 | 3.0 | 6.0 |
| AN | 182 | 123 | 91 |

Example 24

A reaction feed mixture including 28.19% styrene, 37.42% a-methylstyrene, 33.39% acrylic acid and 1% ethylene glycol was continuously passed through a 400 mL CSTR maintained at a constant temperature of 282° C. Feed flow rate was adjusted to provide a residence time of 30 minutes. No inert solvent or peroxide initiator used in this experiment. The reaction product was continuously removed from the reactor, collected, and later analyzed for molecular weight averages ($M_w$ and $M_n$), polydispersity (PD) and Acid Number which indicates the level of functional carboxylic acid groups present on the polymer chains. The polymer product had a $M_n$ of 870, $M_w$ of 1,533, a PD of 1.76, and an acid number of 211.

Example 25

Reaction feed mixtures comprising styrene and acrylic acid monomers, xylene solvent, di-t-butyl peroxide initiator and ethylene glycol modifying agent were prepared according to the formulas specified in Table 23. Each feed mixture was continuously passed through a 500 mL CSTR held at 249° C. Reaction zone level and feed flow rate were adjusted to provide a residence time of 12 minutes. The reaction products were continuously stripped of volatile organic compounds, collected, and later analyzed for molecular weight averages (Mw and M,) and acid number which indicates the level of unreacted functional carboxylic groups remaining on the polymer chains. The analysis reveals that as the multifunctional alcohol level in the formula is increased, an increase in molecular weight is observed and is accompanied by a decrease in acid number. This indicates that polymer chain extension is obtained from the reaction of the pendant carboxylic groups with the multifunctional alcohol reagents, which results in the formation of cross-links. Broadening of the molecular weight distributions is observed as evidenced by the polydispersity index. Results are presented in Table 24.

TABLE 23

| Feed | 25a | 25b | 25c | 25d | 25e |
| --- | --- | --- | --- | --- | --- |
| Styrene | 41.5 | 41.5 | 41.5 | 41.5 | 41.5 |
| AA | 21 | 21 | 21 | 21 | 21 |
| EG | 0.0 | 0.32 | 0.63 | 1.27 | 1.9 |
| DTBP | 0.5 | 0.5 | 0.5 | 0.5 | 0.5 |
| Xylene | 37.0 | 36.68 | 36.37 | 35.73 | 35.1 |

TABLE 24

| Run | $M_n$ | $M_w$ | PD | AN |
| --- | --- | --- | --- | --- |
| 25a | 1,265 | 2,289 | 1.81 | 236 |
| 25b | 1,339 | 2,959 | 2.21 | 229 |
| 25c | 1,528 | 4,022 | 2.63 | 222 |
| 25d | 1,717 | 7,789 | 4.54 | 208 |
| 25e | 1,975 | 20,690 | 10.5 | 200 |

Example 26

Reaction feed mixtures comprising styrene, acrylic acid and 2-ethylhexylacrylate monomers, xylene solvent, di-t-butyl peroxide initiator and a modifying agent (ethylene glycol (EG), 1,6-hexanediol (1,6-HD), or 1,10-decanediol (1,10-DD)) were prepared according to the formulas specified in Table 25. Each feed mixture was continuously passed through a 500 mL CSTR held at 249° C. Reaction zone level and feed flow rate were adjusted to provide a residence time of 12 minutes. The reaction products were continuously stripped of volatile organic compounds, collected, and later analyzed for molecular weight averages ($M_w$ and $M_n$ and acid number which indicates the level of unreacted functional carboxylic groups remaining on the polymer chains. The analysis reveals that as the multifunctional alcohol level in the formula is increased, an increase in molecular weight is observed and is accompanied by a decrease in acid number. This indicates that polymer chain extension is obtained from the reaction of the pendant carboxylic groups with the multifunctional alcohol reagents, which results in the formation of cross-links. Broadening of the molecular weight distributions is observed as evidenced by the polydispersity index. Results are presented in Table 26.

TABLE 25

| Feed | 26a | 26b | 26c | 26d | 26e | 26f | 26g | 26h | 26i | 26j | 26k |
| --- | --- | --- | --- | --- | --- | --- | --- | --- | --- | --- | --- |
| Styrene | 32.2 | 32.2 | 32.2 | 32.2 | 32.2 | 32.2 | 32.2 | 32.2 | 32.2 | 32.2 | 32.2 |
| AA | 21 | 21 | 21 | 21 | 21 | 21 | 21 | 21 | 21 | 21 | 21 |
| 2-EHA | 9.3 | 9.3 | 9.3 | 9.3 | 9.3 | 9.3 | 9.3 | 9.3 | 9.3 | 9.3 | 9.3 |
| 1,6-HD | — | 1.2 | 2.42 | 3.62 | — | — | — | — | — | — | — |
| 1,10-DD | — | — | — | — | 1.77 | 3.56 | 5.33 | — | — | — | 4.32 |
| EG | — | — | — | — | — | — | — | 0.63 | 1.27 | 1.9 | — |
| DTBP | 0.5 | 0.5 | 0.5 | 0.5 | 0.5 | 0.5 | 0.5 | 0.5 | 0.5 | 0.5 | 0.5 |
| Xylene | 37.0 | 35.8 | 34.58 | 33.38 | 35.23 | 33.44 | 31.67 | 36.37 | 35.73 | 35.1 | 32.68 |

TABLE 26

| Run | $M_n$ | $M_w$ | PD | AN |
| --- | --- | --- | --- | --- |
| 26a | 1,293 | 2,198 | 1.70 | 231 |
| 26b | 1,501 | 4,430 | 2.95 | 220 |
| 26c | 1,698 | 10,440 | 6.15 | 206 |
| 26d | 1,921 | 31,230 | 16.3 | 192 |
| 26e | 1,481 | 5,105 | 3.45 | 215 |
| 26f | 1,716 | 15,950 | 9.3 | 201 |
| 26g | 1,873 | 61,220 | 32.7 | 184 |
| 26h | 1,338 | 3,132 | 2.34 | 222 |
| 26i | 1,485 | 5,292 | 3.56 | 210 |
| 26j | 1,807 | 9,733 | 5.39 | 199 |
| 26k | 1,883 | 36,570 | 19.4 | 189 |

Example 27

A reaction mixture of 42% styrene, 21% acrylic acid, 3.4% Dytekq A (a commercial product of DuPont, Wilmington, Del.) 33.1% NMP and 0.5% DTBP is continuously passed through a 500 mL CSTR maintained at 247° C. Reaction zone level and feed flow rate are adjusted to provide a residence time of 12 minutes. A reaction product is obtained and analyzed for acid number, $M_w$ and $M_n$.

Example 28

A reaction misture of 42% styrene, 21% acrylic acid, 5.0% Isophorone diamine, 31.5% NMP and 0.5% DTBP is continuously passed through a 500 mL CSTR maintained at 247° C. Reaction zone level and feed flow rate are adjusted to provide a residence time of 12 minutes. A reaction product is obtained and analyzed for acid number, $M_w$ and $M_n$.

TABLE 27

| Temperature (° C.) | $M_w$ | PD | AN |
|---|---|---|---|
| 249 | 2,072 | 1.63 | 210 |

Example 29

A reaction mixture was prepared by adding varying levels of either pentaerythritol or trimethylolpropane to the monomer mixture of Example 28. However, in the case of trimethylolpropane, the solvent was changed to xylene. The formulas are presented in Table 28.

TABLE 28

| Feed | 29a | 29b | 29c | 29d | 29e | 29f |
|---|---|---|---|---|---|---|
| Styrene | 32.2 | 32.2 | 32.2 | 32.2 | 32.2 | 32.2 |
| AA | 21 | 21 | 21 | 21 | 21 | 21 |
| 2-EHA | 9.3 | 9.3 | 9.3 | 9.3 | 9.3 | 9.3 |
| TMP | 0.40 | 0.81 | 1.21 | — | — | — |
| Pentaerythritol | — | — | — | 0.24 | 0.48 | 0.72 |
| DTBP | 0.5 | 0.5 | 0.5 | 0.5 | 0.5 | 0.5 |
| NMP | — | — | — | 36.76 | 36.52 | 36.28 |
| Xylene | 36.6 | 36.19 | 35.79 | — | — | — |

The resulting mixtures were continuously passed through a 500 mL CSTR maintained at 249° C. Reaction zone level and feed flow rate were adjusted to provide a residence time of 12 minutes. The reaction products were continuously stripped of volatile organic compounds, collected, and later analyzed for molecular weight averages ($M_w$ and $M_n$) and acid number which indicates the level of unreacted functional carboxylic groups remaining on the polymer chains. The analysis reveals that as the multifunctional alcohol level in the formula is increased, an increase in molecular weight is observed accompanied by a decrease in acid number. This indicates that polymer chain extension is obtained from the reaction of the pendant carboxylic groups with the multifunctional alcohol reagents, which results in the formation of cross-links. Slight broadening of the molecular weight distributions is observed as evidenced by the polydispersity index. Results are presented in Table 29. Trimethylolpropane reacted less based on AN, but the $M_w$ increased and broadened more then the pentaerythritol-containingexamples.

TABLE 29

| Run | $M_n$ | $M_w$ | PD | AN |
|---|---|---|---|---|
| 29a | 1,428 | 2,832 | 1.98 | 228 |
| 29b | 1,519 | 3,693 | 2.43 | 221 |
| 29c | 1,436 | 5,110 | 3.56 | 216 |
| 29d | 1,337 | 2,314 | 1.73 | 207 |
| 29e | 1,237 | 2,372 | 1.92 | 209 |
| 29f | 1,265 | 2,629 | 2.08 | 198 |

Example 30

A number of mixtures of different formula compositions comprising acrylic acid, styrene, caprolactam, di-t-butyl peroxide, xylene and p-TSA were prepared. The formulas are listed in Table 30. All the ingredients were placed in the solvent and mixed for 20 minutes. Two grams of each formula were added to each of four ampoules. These ampoules were sealed under vacuum after three freeze-thaw degassing cycles. One ampoule of each formula listed in Table 30 was heated in an oil bath for a period of 20 minutes at a constant temperature of 218° C. Similarly, another set of ampoules were heated in an oil bath for 120 minutes. The process was repeated at 246° C. for 20 minutes and 120 minutes. The ampoules were subsequently removed from the oil bath, quenched, and evaluated for molecular weight by GPC, and residuals by gas chromatography. The reaction conditions are set forth in Table 31.

TABLE 30

| Formula | Caprolactam (grams) | AA (grams) | Styrene (grams) | Di-t-butyl peroxide (grams) | p-TSA (grams) | Xylene (grams) |
|---|---|---|---|---|---|---|
| 30a | 3.00 | 1.97 | 1.96 | 0.046 | 0.04 | 3.00 |
| 26b | 3.00 | 1.97 | 1.96 | 0.047 | — | 3.00 |

TABLE 31

| Formula | Time in Oil Bath (minutes) | $M_n$ | $M_w$ | T (° C.) |
|---|---|---|---|---|
| 30a | 20 | 1957 | 8982 | 218 |
| 30a | 120 | 1661 | 8185 | 218 |
| 30a | 20 | 1534 | 6810 | 246 |
| 30a | 120 | 1502 | 6025 | 246 |
| 30b | 20 | 1871 | 8579 | 218 |
| 30b | 120 | 1640 | 7821 | 218 |
| 30b | 20 | 1481 | 6328 | 246 |
| 30b | 120 | 1504 | 5802 | 246 |

Example 31

A reaction mixture of styrene, hydroxyethyl methacrylate (HEMA), adipic acid, 1-methyl-2-pyrrolidinone and di-tertiary butyl peroxide (Table 32) was continuously passed through a 500 mL CSTR maintained at a constant temperature of 249° C. Feed flow rate was adjusted to provide a residence time of 12 minutes. The reaction product was continuously collected from the reactor discharge was not stripped of volatile organic compounds. The product was later analyzed for molecular weight averages ($M_w$ and $M_n$) and polydispersity (PD) as well as acid number which indicates the level of functional hydroxy groups present on the polymer chains. The results of these reactions are presented in Table 33.

TABLE 32

| Feed (wt. %) | 31a | 31b | 31c | 31d |
|---|---|---|---|---|
| Styrene | 50 | 50 | 50 | 50 |
| HEMA | 25 | 25 | 25 | 25 |
| Adipic acid | 0 | 0.98 | 1.97 | 2.95 |
| NMP | 24.75 | 23.77 | 22.78 | 21.8 |
| Di-t-butyl peroxide | 0.25 | 0.25 | 0.25 | 0.25 |

TABLE 33

| Polymer | 31a | 31b | 31c | 31d |
|---|---|---|---|---|
| $M_n$ | 2,446 | 2,401 | 2,274 | 2,307 |
| $M_w$ | 5,711 | 5,838 | 5,759 | 6,162 |
| PD | 2.335 | 2.431 | 2.533 | 2.671 |
| OH # | 164.1 | 154.7 | 152.6 | 141.3 |

Example 32

A reaction mixture of styrene, 2-ethyl hexyl acrylate, acrylic acid, methyl methacrylate, 4-methylcyclohexane methanol, cyclohexane dimethanol and di-tertiary butyl peroxide (Table 34) was continuously passed through a 500 mL CSTR maintained at a constant temperature of either 232° C. or 249° C. The reaction product was continuously stripped of volatile organic compounds, collected, and later analyzed for molecular weight averages ($M_w$ and $M_n$), polydispersity (PD) and Acid Number representing the level of functional carboxylic groups present on the polymer chains. The results of these reactions are presented in Table 35. This example demonstrates the ability of utilizing both a monofunctional and a non polymeric multifunctional modifying agent simultaneously in the process.

TABLE 34

| Feed (wt. %) | 32a | 32b | 32c | 32d | 32e | 32f |
|---|---|---|---|---|---|---|
| Styrene | 9.29 | 9.10 | 8.91 | 9.29 | 9.10 | 8.91 |
| 2-EHA | 9.09 | 8.90 | 8.72 | 9.09 | 8.90 | 8.72 |
| AA | 15.35 | 15.03 | 14.72 | 15.35 | 15.03 | 14.72 |
| MMA | 34.19 | 33.48 | 32.79 | 34.19 | 33.48 | 32.79 |
| MCHM | 31.82 | 31.16 | 30.51 | 31.82 | 31.16 | 30.51 |
| CHDM | 0 | 2.08 | 4.11 | 0 | 2.08 | 4.11 |
| DTBP | 0.25 | 0.25 | 0.25 | 0.25 | 0.25 | 0.25 |

TABLE 35

| Run | Temperature (° C.) | Mn | Mw | PD | AN |
|---|---|---|---|---|---|
| 32a | 232 | 1,517 | 2,964 | 1.954 | 120.3 |
| 32b | 232 | 1,665 | 3,456 | 2.089 | 116.2 |
| 32c | 232 | 1,658 | 3,649 | 2.201 | 112.8 |
| 32d | 249 | 1,255 | 2,257 | 1.798 | 108.2 |
| 32e | 249 | 1,385 | 2,708 | 1.955 | 105.8 |
| 32f | 249 | 1,403 | 2,905 | 2.071 | 104.0 |

Continuous High Temperature Polymerization Modified by Condensation with a Polymeric Modifying Agent

Example 33

A monomer mixture was prepared by mixing monomers in a weight ratio of 28.4 parts styrene, 33.8 parts acrylic acid, and 37.8 parts α-methylstyrene monomers. A reaction mixture of the monomer mixture and varying weight percentages of Dow $P_{425}$™, a polypropylene glycol polymeric modifying agent available from The Dow Chemical Company (Midland, Mich.), as specified in Table 36, was continuously passed through a 500 mL CSTR maintained at a constant temperature. The polypropylene glycol polymeric modifying agent had a $M_n$ of 425 and an average functionality of two hydroxyl condensation reactive groups on each chain. Reaction zone level and feed flow rate were adjusted to provide a residence time of 12 or 24 minutes, as specified in Table 36. The temperature of the reaction zone was maintained at 282° C. The reaction product was continuously collected and later analyzed for molecular weight averages ($M_n$, $M_w$ and $M_z$) and acid number which indicates the level of functional carboxylic groups present on the polymer chains. Results are presented in Table 36.

TABLE 36

| Example | Res. Time (min.) | % P425 ™ | $M_n$ | $M_w$ | $M_z$ | AN |
|---|---|---|---|---|---|---|
| 33a | 12 | 6 | 918 | 2,057 | 5,083 | 217.3 |
| 33b | 12 | 10 | 965 | 2,271 | 5,604 | 202.6 |
| 33c | 12 | 10 | 953 | 1,958 | 4,433 | 203.7 |
| 33d | 12 | 15 | 984 | 1,973 | 3,907 | 185.7 |
| 33e | 12 | 20 | 1,022 | 2,219 | 4,849 | 171.2 |
| 33f | 12 | 25 | 1,051 | 2,412 | 5,956 | 149.7 |
| 33g | 12 | 30 | 1,043 | 2,392 | 5,788 | 135.6 |
| 33h | 12 | 40 | 1,019 | 2,251 | 5,276 | 112.6 |
| 33i | 24 | 6 | 816 | 1,449 | 2,592 | 218.9 |
| 33j | 24 | 10 | 871 | 1,674 | 3,241 | 200.5 |

Example 34

The reaction product collected from the CSTR of Example 33 for four different formulas (33b, 33d, 33e and 33g) was added to a 1000 mnL reactor and subjected to continuous heat treatment at a constant temperature for a specified period of time. The reaction product was again analyzed for molecular weight averages ($M_n$, $M_w$, $M_z$) and acid number which indicates the level of functional carboxylic groups remaining on the polymer chains. The analysis results are listed in Table 37 along with the time and temperature utilized for each formula. The analysis indicates that after heat treatment, the acid number of the polymer product decreased while its $M_w$ increased, without the formation of a gel product. This demonstrates the utility of employing a plug flow reaction zone as a secondary reactor following the CSTR of Example 33 to increase the level of condensation between the polymer product and the polymeric modifying agent.

TABLE 37

| Example | Starting Polymer | Temp (° C.) | Time (minutes) | $M_n$ | $M_w$ | $M_z$ | AN |
|---|---|---|---|---|---|---|---|
| 34a | 33b | 215 | 45 | 1,109 | 2,794 | 6,489 | 201.2 |
| 34b | 33b | 215 | 180 | 1,139 | 2,984 | 7,241 | 197.4 |
| 34c | 33d | 278 | 30 | 1,232 | 3,539 | 9,579 | 163.5 |
| 34d | 33d | 280 | 60 | 1,214 | 3,500 | 9,863 | 151.5 |
| 34e | 33e | 215 | 60 | 1,244 | 4,065 | 12,630 | 152.6 |
| 34f | 33e | 215 | 240 | 1,482 | 7,853 | 29,210 | 134.8 |
| 34g | 33g | 215 | 60 | 1,420 | 4,581 | 13,530 | 117.3 |
| 34h | 33g | 215 | 270 | 2,180 | 31,200 | 185,800 | 91.6 |

Example 35

Reaction feed mixtures of styrene, acrylic acid and a-methylstyrene monomers, di-t-butyl peroxide free radical initiator, methyl amyl ketone solvent and a polymeric modifying agent were prepared as specified in Table 38. The polymeric modifying agent was Rucote® 112, a polyester available from Ruco Polymer Corp. (Hicksville, N.Y.), which had a $M_n$ of 4,233. Each of these mixtures was continuously passed through a 500 mL CSTR maintained at a constant temperature. Reaction zone level and feed flow rate were adjusted to provide a residence time of 12 minutes. The temperature of the reaction zone was maintained at 204°

C. The reaction product was continuously collected and later analyzed for molecular weight averages ($M_n$, $M_w$ and $M_z$) and acid number which indicates the level of functional carboxylic groups present on the polymer chains. The polymer product properties are presented in Table 39.

TABLE 38

| Components in Feed | 35a % (w/w) | 35b % (w/w) |
|---|---|---|
| Styrene | 8.4 | 8.4 |
| AA | 10.0 | 10.0 |
| AMS | 11.2 | 11.2 |
| Rucote ® 112 | 39.4 | 34.4 |
| MAK | 29.0 | 34.0 |
| DTBP | 2.0 | 2.0 |

TABLE 39

| Feed mixture formula | $M_n$ | $M_w$ | $M_z$ | AN |
|---|---|---|---|---|
| 35a | 2,227 | 8,308 | 19,920 | 86.6 |
| 35b | 2,032 | 7,287 | 18,170 | — |

Example 36

The reaction product collected from the CSTR of Example 35a was added to a 1000-ml reactor and subjected to continuous heat treatment at a constant temperature of 220° C. for varying periods of time as specified in Table 40. The reaction product was again analyzed for molecular weight averages ($M_n$, $M_w$ and $M_z$) and acid number which indicates the level of functional carboxylic groups remaining on the polymer chains. The analysis indicates that as the heat treatment time period increases, the reaction product acid number decreases and its molecular weight increases, without the formation of a gel product. This demonstrates the utility of employing a plug flow reaction zone as a secondary reactor following the CSTR of Example 35a to increase the level of condensation between the polymer product and the polymeric modifying agent. Results are presented in Table 40.

TABLE 40

| Treatment Time (minutes) | $M_n$ | $M_w$ | $M_z$ | AN |
|---|---|---|---|---|
| 4 | 2,467 | 10,940 | 25,700 | 82.7 |
| 25 | 2,725 | 15,330 | 40,620 | 77.9 |
| 55 | 3,067 | 23,360 | 75,420 | 74.0 |
| 85 | 3,227 | 29,320 | 106,100 | 71.5 |

Example 37

The reaction product collected from the CSTR of Example 35b was added to a 1000-ml reactor and subjected to continuous heat treatment at a constant temperature of 200° C. for varying periods of time as specified in Table 41. The reaction product was again analyzed for molecular weight averages ($M_n$, $M_w$ and $M_z$) and acid number which indicates the level of functional carboxylic groups remaining on the polymer chains. The analysis indicates that as the heat treatment time period increases, the reaction product acid number decreases and its molecular weight increases, without the formation of a gel product. This demonstrates the utility of employing a tube reaction zone as a secondary reactor following the CSTR of Example 35b to increase the level of condensation between the polymer product and the polymeric modifying agent. Results are presented in Table 41.

TABLE 41

| Treatment Time (minutes) | $M_n$ | $M_w$ | $M_z$ | AN |
|---|---|---|---|---|
| 35 | 2,179 | 9,522 | 23,640 | 101.5 |
| 65 | 2,502 | 15,850 | 44,300 | 96.4 |
| 95 | 2,607 | 18,360 | 55,980 | 92.3 |

Example 38

Reaction feed mixtures of styrene, acrylic acid, α-methylstyrene and 2-ethyl hexyl acrylate monomers, di-t-butyl peroxide free radical initiator, methyl amyl ketone solvent and a polymeric modifying agent were prepared as specified in Table 42. The polymeric modifying agent was a polyester (Rucote® 112) which had a $M_n$ of 4,233. Each of these mixtures was continuously passed through a 500 mL CSTR maintained at a constant temperature. Reaction zone level and feed flow rate were adjusted to provide a residence time as specified in Table 42. The temperature of the reaction zone was maintained at constant temperature as specified in Table 42. The reaction product was continuously collected and later analyzed for molecular weight averages ($M_n$, $M_w$ and $M_z$) and acid number which indicates the level of functional carboxylic groups present on the polymer chains. The properties of the polymer product from the evaporator exit are presented in Table 43.

TABLE 42

| Reactor Feed And Conditions | 38a | 38b | 38c | 38d |
|---|---|---|---|---|
| % Styrene (w/w) | 5.3 | 5.3 | 5.3 | 5.3 |
| % AA (w/w) | 10.3 | 10.3 | 10.3 | 10.3 |
| % AMS (w/w) | 11.4 | 11.4 | 11.4 | 11.4 |
| % 2-EHA (w/w) | 2.3 | 2.3 | 2.3 | 2.3 |
| % Rucote ® 112 (w/w) | 40.0 | 40.0 | 40.0 | 40.0 |
| % MAK (w/w) | 30.7 | 31.6 | 31.6 | 30.7 |
| % DTBP (w/w) | 1.0 | 0.1 | 0.1 | 1.0 |
| CSTR Res. Time (minutes) | 15.7 | 15.7 | 31.5 | 31.5 |
| Reactor Temperature (° C.) | 222 | 244 | 235 | 207 |

TABLE 43

| Feed mixture formula | $M_n$ | $M_w$ | $M_z$ | AN | NV |
|---|---|---|---|---|---|
| 38a | 2,323 | 8,356 | 18,690 | 100.4 | 98.2 |
| 38b | 2,390 | 7,996 | 17,090 | 91.3 | 97.4 |
| 38c | 2,472 | 8,305 | 18,410 | 93.2 | 98.1 |
| 38d | 2,460 | 9,691 | — | 103.6 | 98.0 |

Example 39

This example describes the preparation of a linear polyester to be used as a polymeric modifying agent in subsequent examples. This linear polyester was prepared from the formula shown in Table 44. The MP Diol, isophthalic acid, and Fascat® 4100, a hydrated monobutyltin oxide available from Elf Atochem (Paris, France), were added to a reactor outfitted with a packed column. The mixture was heated to 210° C. over three hours while maintaining the temperature of the column at 97° C. Approximately 6.5 weight percent water was collected. The reaction was cooled to 116° C. and 1,4-cyclohexanedicarboxylic acid was added. The reaction was then heated to 216° C. over 2 hours. Subsequently, the column was bypassed to allow for water removal. The reaction temperature was increased to 229° C. over another 1.5 hours, and 6.4 weight percent water was collected from this second stage reaction. The final polymer properties are shown in Table 45.

TABLE 44

| Chemical | % in Feed |
| --- | --- |
| MP Diol | 37.28 |
| Isophthalic Acid | 41.26 |
| 1,4-Cyclohexanedicarboxylic Acid (CHDA) | 21.38 |
| Hydrated Monobutyltin Oxide | 0.08 |

TABLE 45

| Test | Test Result |
| --- | --- |
| Non-Volatiles | 99.35 |
| AN | 5.4 |
| OH Content | 54.8 |
| $T_g$ onset temperature (° C.) | 9 |
| $T_g$ midpoint temperature (° C.) | 13 |

Example 40

Reaction feed mixtures of styrene, acrylic acid, α-methylstyrene and 2-ethyl hexyl acrylate monomers, di-t-butyl peroxide free radical initiator, methyl amyl ketone solvent and a polymeric modifying agent were prepared as specified in Table 46. The polymeric modifying agent was the linear polyester prepared in Example 39. Each of these mixtures was continuously passed through a 500 mL CSTR maintained at a constant temperature. Reaction zone level and feed flow rate were adjusted to provide a residence time as specified in Table 46. The temperature of the reaction zone was maintained at constant temperature as specified in Table 46. The reaction product was continuously collected and later analyzed for molecular weight averages ($M_n$, $M_w$ and $M_z$) and acid number which indicates the level of functional carboxylic groups present on the polymer chains. The properties of the polymer product from the evaporator exit are presented in Table 47.

TABLE 46

| Reactor Feed and Conditions | 40a | 40b | 40c | 40d |
| --- | --- | --- | --- | --- |
| % Styrene (w/w) | 5.3 | 5.3 | 5.3 | 5.3 |
| % AA (w/w) | 10.3 | 10.3 | 10.3 | 10.3 |
| % AMS (w/w) | 11.4 | 11.4 | 11.4 | 11.4 |
| % 2-EHA (w/w) | 2.3 | 2.3 | 2.3 | 2.3 |
| % Linear PE (w/w) | 28.0 | 28.0 | 28.0 | 28.0 |
| % MAK (w/w) | 41.7 | 42.6 | 42.6 | 41.7 |
| % DTBP (w/w) | 1.0 | 0.1 | 0.1 | 1.0 |
| CSTR Time (minutes) | 15.7 | 15.7 | 31.5 | 31.5 |
| Reactor Temperature (° C.) | 222 | 244 | 235 | 207 |

TABLE 47

| Feed mixture formula | $M_n$ | $M_w$ | $M_z$ | AN | NV |
| --- | --- | --- | --- | --- | --- |
| 40a | 1,869 | 4,455 | 9,089 | 117.5 | 98.1 |
| 40b | 1,864 | 4,978 | 10,540 | 101.9 | 97.3 |
| 40c | 1,879 | 4,696 | 9,394 | 92.2 | — |
| 40d | 2,008 | 5,072 | 11,820 | 118.7 | 98.4 |

Example 41

The process of Example 40 was repeated at the same conditions and compositions as mixtures 40a, 40b, 40c, and 40d, except that 0.2 wt. % of the esterification catalyst p-toluenesulfonic acid was added to the feed, in place of 0.2 wt. % methyl amyl ketone solvent. The newly obtained feed mixtures are 41a, 41b, 41c, and 41d. Results from the analysis of the polymer product are shown in Table 48.

TABLE 48

| Feed Formula | $M_n$ | $M_w$ | $M_z$ | AN |
| --- | --- | --- | --- | --- |
| 41a | 1,682 | 4,327 | 9,901 | 87.1 |
| 41b | 1,897 | 5,078 | 11,780 | 96.0 |
| 41c | 1,884 | 6,635 | 34,250 | 84.1 |
| 41d | 2,025 | 5,914 | 20,830 | 105.6 |

Results indicate that the addition of the esterification catalyst p-TSA increases the level of esterification reaction, as evidenced by the higher molecular weights and lower acid numbers obtained in the polymer products of Example 41 as compared to those obtained in Example 40.

Example 42

The reaction product collected from the CSTR of Example 40b was added to a 1000-ml reactor and subjected to continuous heat treatment at a constant temperature of 240° C. for varying periods of time as specified in Table 49. The reaction product was again analyzed for molecular weight averages ($M_n$, $M_w$ and $M_z$) and acid number which indicates the level of functional carboxylic groups remaining on the polymer chains. The analysis indicates that as the heat treatment time period increases, the reaction product acid number decreases and its molecular weight increases, without the formation of a gel product. This demonstrates the utility of employing a plug flow reaction zone as a secondary reactor following the CSTR of Example 40b to increase the level of condensation between the polymer product and the polymeric modifying agent. Results are presented in Table 49.

TABLE 49

| Time (min) | $M_n$ | $M_w$ | $M_z$ | AN |
| --- | --- | --- | --- | --- |
| 15 | 2,893 | 16,220 | 57,750 | 90.7 |
| 30 | 3,229 | 30,140 | 165,300 | 87.6 |
| 45 | 3,253 | 50,700 | 355,900 | 86.1 |
| 55 | 3,549 | 113,800 | 1,300,000 | 85.2 |

Example 43

The conditions of Example 40c were repeated. The reaction product was collected from the CSTR and added to a 1000-ml reactor and subjected to continuous heat treatment at a constant temperature of 240° C. for varying periods of time as specified in Table 50. The reaction product was again analyzed for molecular weight averages ($M_n$, $M_w$ and $M_z$) and acid number which indicates the level of functional carboxylic groups remaining on the polymer chains. The analysis indicates that as the heat treatment time period increases, the reaction product acid number decreases and its molecular weight increases, without the formation of a gel product, up to a reaction time of 45 minutes. This demonstrates the utility of employing a plug flow reaction zone, with a suitably selected residence time, as a secondary reactor following the CSTR of Example 40c to increase the level of condensation between the polymer product and the polymeric modifying agent. Results are presented in Table 50. As shown, the polymer product collected after 90 minutes had undergone gelation, suggesting that the suitable residence time for operation has to be maintained at a lesser value.

TABLE 50

| Time (min.) | $M_n$ | $M_w$ | $M_z$ | AN |
| --- | --- | --- | --- | --- |
| 15 | 2,989 | 20,100 | 83,890 | 95.6 |
| 30 | 3,121 | 28,220 | 147,100 | 93.9 |
| 45 | 3,323 | 44,050 | 277,500 | 92.0 |
| 90 | gel | gel | gel | gel |

Example 44

A feed mixture was prepared as specified in Table 51 and fed to a CSTR followed by a tube reactor. The residence time of the CSTR was maintained at 15 minutes and 222° C. The tube residence time was 20 min. at a temperature of 232° C. The resulting polymer was collected from the evaporator. The polyester of example 39 is used in this example.

TABLE 51

| Feed Components | Composition |
| --- | --- |
| % Styrene (w/w) | 5.3 |
| % AMS (w/w) | 11.4 |
| % AA (w/w) | 10.3 |
| % 2-EHA (w/w) | 2.3 |
| % MAK (w/w) | 55.7 |
| % DTBP (w/w) | 1.0 |
| % Polyester (w/w) | 14.0 |

Example 45

The feed mixtures are prepared as specified in Table 52. The CSTR feed mixture is fed at 0.52 lbs./min while controlling the level in the CSTR to maintain a 15 min residence time while the temperature is maintained at 222° C. The CSTR discharge is fed to a tube reactor where it is combined with the tube feed specified in Table 52. The polyester tube feed is fed at 0.28 lbs./min. The tube reactor residence time is 20 min. and the temperature is maintained at 232° C. The resulting polymer is collected from the evaporator.

TABLE 52

| Feed Components | Composition |
| --- | --- |
| CSTR Feed | |
| % Styrene (w/w) | 5.3 |
| % AMS (w/w) | 11.4 |

TABLE 52-continued

| Feed Components | Composition |
| --- | --- |
| % AA (w/w) | 10.3 |
| % 2-EHA (w/w) | 2.3 |
| % MAK (w/w) | 34.7 |
| % DTBP (w/w) | 1.0 |
| Tube Feed | |
| % Polyester (w/w) | 14.0 |
| % MAK (w/w) | 21.0 |

Example 46

The feed mixture was prepared as specified in Table 53 and fed to a CSTR. 5 The residence time of the CSTR was maintained at 30 minutes and 271° C. The resulting polymer was collected from the evaporator. The polyester of example 39 is used in this example.

TABLE 53

| Feed Components | w/w % |
| --- | --- |
| % Styrene (w/w) | 8.93 |
| % AMS (w/w) | 19.22 |
| % AA (w/w) | 17.37 |
| % 2-EHA (w/w) | 3.88 |
| % MAK (w/w) | 8.37 |
| % DTBP (w/w) | 0.93 |
| % Polyester (w/w) | 34.32 |
| Divinylbenzene | 3.91 |
| Ethylvinylbenzene | 2.93 |

Example 47

The conditions of Example 40a are repeated except that the polyester is melted and fed separately to the reactor. The resulting polymer is collected from the evaporator.

Example 48

This example describes the preparation of a polyamide to be used as a polymeric modifying agent in subsequent examples. This polyamide was prepared from the formula shown in Table 54. Sylvadyme™ T18, a dimerized fatty acid available from Arizona Chemical Company (Panama City, Fla.), Adogen® 140D, a hydrogenated tallow amine available from Witco Corp. (Dublin, Ohio), and ethylene diamine were added to a reactor, heated to 104° C., and held for 1 hour. The 2-methyl-1,5-diaminopentane was then fed to the reactor over 5 minutes. The reaction was heated to 193° C. over 5 hours. The amount of water collected from the reaction was 4.3 weight percent. The final polymer properties are shown in Table 55.

TABLE 54

| Chemical | % in Polymer |
| --- | --- |
| Sylvadyme ™ T18 (dimer acid) | 79.28 |
| Adogen ® D140 (Stearyl amine) | 3.80 |
| DC200 | 0.02 |
| Ethylene Diamine | 1.93 |
| 2-methyl-1,5-diaminopentane | 14.97 |

TABLE 55

| Test | Test Result |
|---|---|
| Non-Volatiles | 99.68 |
| AN | 1.8 |
| Amine Content | 27.5 |
| $T_g$ onset temperature (° C.) | −15 |
| $T_g$ midpoint temperature (° C.) | −6 |

Example 49

Reaction feed mixtures of styrene, acrylic acid, a-methylstyrene and 2-ethyl hexyl acrylate monomers, di-t-butyl peroxide free radical initiator, NMP solvent and a polymeric modifying agent were prepared as specified in Table 56. The polymeric modifying agent was the polyamide prepared in Example 48. Each of these mixtures was continuously passed through a 500 mL CSTR maintained at a constant temperature. Reaction zone level and feed flow rate were adjusted to provide a residence time as specified in Table 56. The temperature of the reaction zone was maintained at constant temperature as specified in Table 56. The reaction product was continuously collected and later analyzed for molecular weight averages ($M_n$, $M_w$ and $M_z$) and acid number which indicates the level of functional carboxylic groups present on the polymer chains. The properties of the polymer product from the evaporator exit are presented in Table 57.

TABLE 56

| Reactor Feed and Conditions | 49a | 49b | 49c | 49d | 49e | 49f | 49g | 49h |
|---|---|---|---|---|---|---|---|---|
| % Styrene (w/w) | 5.28 | 5.28 | 5.30 | 5.30 | 5.29 | 5.29 | 5.29 | 5.29 |
| % AA (w/w) | 10.28 | 10.28 | 10.30 | 10.30 | 10.29 | 10.29 | 10.29 | 10.29 |
| % AMS (w/w) | 11.37 | 11.37 | 11.37 | 11.37 | 11.39 | 11.39 | 11.39 | 11.30 |
| % 2-EHA (w/w) | 2.20 | 2.29 | 2.30 | 2.30 | 2.30 | 2.30 | 2.30 | 2.30 |
| % Polyamide (w/w) | 7.39 | 14.78 | 22.17 | 29.56 | 36.96 | 36.96 | 36.96 | 36.96 |
| % NMP (w/w) | 63.29 | 55.90 | 48.46 | 41.08 | 32.78 | 33.67 | 32.78 | 33.67 |
| % DTBP (w/w) | 0.10 | 0.10 | 0.10 | 0.10 | 1.00 | 0.10 | 1.00 | 1.00 |
| CSTR Res. Time (min.) | 31 | 35 | 34 | 35 | 13 | 18 | 32 | 32 |
| Reactor Temperature (° C.) | 235 | 235 | 235 | 235 | 222 | 244 | 207 | 235 |

TABLE 57

| Example No. | $M_n$ | $M_w$ | $M_z$ | AN | NV |
|---|---|---|---|---|---|
| 49a | 1,294 | 5,106 | 19,430 | 133.7 | 60.6 |
| 49b | 1,618 | 7,709 | 26,110 | 130.0 | 81.4 |
| 49c | 1,967 | 11,090 | 40,060 | 107.1 | 87.8 |
| 49d | 2,208 | 13,160 | 44,141 | 89.0 | 88.1 |
| 49e | 2,003 | 12,010 | 39,780 | 83.4 | 91.3 |
| 49f | 2,200 | 11,980 | 35,000 | 73.14 | 90.3 |
| 49g | 2,151 | 12,800 | 43,530 | 83.4 | 94.3 |
| 49h | 2,379 | 14,620 | 45,670 | 78.4 | 92.3 |

Example 50

The conditions of Example 49e are repeated except the polyamide is melted and fed separately to the reactor. The resulting polymer is collected from the evaporator.

Example 51

A surfactant solution was prepared by dissolving 461 grams of the polymer from Example 26d in 960 grams deionized water and 91 grams of 28% ammonia at 80° C. over 150 minutes. The resulting solution had the properties in Table 58.

TABLE 58

| Property | Value |
|---|---|
| NV | 30.06 |
| PH | 8.08 |
| Viscosity at 25° C. (cps) | 1,790 |
| Adjusted AN | 196 |
| $M_w$ | 24,410 |

Example 52

An emulsion polymer was formed using 430 grams of the Example 51 surfactant solution, 9.9 grams of 28% ammonia, 127 grams deionized water, 3.6 grams Dow P1200™, a propylene glycol available from The Dow Chemical Company (Midland, Mich.), and 0.3 grams Tergitol®D 15-S-9, a mixture of ethoxylated C11 –C15 secondary alcohols available from Union Carbide (Danbury, Conn.), were added to a glass reactor outfitted with an agitator and heating control. The mixture was heated to 83° C. and then 17.5 grams of a 15% ammonium persulfate solution in deionized water was added to the reactor. A mixture containing 77.5 grams of 2-ethylhexyl acrylate, 180.9 grams methyl methacrylate, and 7.0 grams Tergitol® 15-S-9 was fed to the reactor over 75 minutes. An additional 112 grams of Example 51 surfactant was added to the reactor at 50 minutes into the monomer feed. At 58 minutes into the monomer feed, 31 grams of a 16% BASF Pluronic® F127, a block copolymer of ethylene oxide and propylene oxide available from BASF (Ludwigshafen, Germany), in deionized water was added to the reactor. At the end of the feed, 0.9 grams of t-butyl hydroperoxide was added to the reactor. Next, 1.64 grams of a 9% sodium erythorbate solution in deionized water was added to the reactor. The contents were maintained for 15 minutes and then cooled. The resulting emulsion polymer was relatively free of coagulation and had the properties listed in Table 59. This example demonstrates the utility of using the polymer of Example 26d as a surfactant stabilizer for an emulsion polymer.

TABLE 59

| Property | Value |
|---|---|
| NV | 41.6 |
| Viscosity at 25° C. (cps) | 79,000 |
| PH | 8.68 |

Example 53

A paint modifier was prepared using 204.2 grams of the polymer from Example 49h which was dissolved in 337.6 grams of deionized water and 8.2 grams of 28 % ammonia. The resulting solution was used as a coating modifier.

Example 54

A comparative coating was prepared as follows. Joncryl®-819, an acrylic polymer available from S.C. Johnson & Sons, Inc.,(Racine, Wis.), (270 parts), 1.5 parts benzoin, 5.0 parts Modaflow®, a commercial product available from Monsanto Chemical Company (St. Louis, Miss.), 185.4 parts R-960™ TiO2, a product available from of E.I. DuPont De Nemours & Co. (Wilmington, Del.), and 37.7 parts of triglycidylisocyanurate were combined and mixed together. The formulation was mixed and sprayed by a standard powder coating process. The coated panel was baked at 190° C. for 20 minutes yielding a high gloss 2 mil film.

A coating containing a polymeric product of the present invention was prepared using the polymeric product of Example 9b. The product of Example 9b is mixed with appropriate amounts of benzoin, Modaflow7, R-9609 $TiO_2$ and triglycidylisocyanurate. The formulation is mixed and sprayed by a standard powder coating process. The coated panel is baked at 190° C. for 20 minutes to yield a high gloss 2 mil film.

Example 55

The emulsion of Example 52 (47 parts), Joncryl® 52 resin (30 parts), Jonwax® 26, a wax emulsion product available from S.C. Johnson & Sons, Inc. (Racine, Wis.) (8.0 parts), ethylene glycol monobutyl ether (4.0 parts) and water (11 parts) are mixed together producing an overprint varnish. The overprint varnish can be applied, for example over paper or paperboard stock.

Example 56

A feed mixture is prepared as specified in Table 60 and fed to a CSTR. The residence time is maintained at 15 minutes at 320° C. and the resulting polymer is collected from the evaporator.

TABLE 60

| Feed Components | w/w % |
|---|---|
| Styrene (w/w) | 80.5 |
| AA (w/w) | 15.0 |
| HEMA (w/w) | 4.5 |

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A continuous polymerization and condensation process, comprising:
   (a) continuously charging into a primary reactor:
      (i) at least one radically-polymerizable monomer having a radically polymerizable group and also having at least one condensation reactive functionality; and,
      (ii) at least one modifying agent having a functional group capable of reacting with the condensation reactive functionality on the radically-polymerizable monomer, wherein each modifying agent is a monohydroxy alcohol, and wherein each modifying agent does not have the formula ROH, wherein R is a linear or branched chain alkyl radical having greater than 11 carbon atoms; and
   (b) maintaining an effective temperature in the primary reactor to cause polymerization of the monomer and to allow at least a portion of the condensation reactive functionality to react with the functional group of the modifying agent, wherein a first polymeric product is produced which incorporates at least some of the modifying agent, wherein the effective temperature in the primary reactor is at least 300° C.

2. A continuous polymerization and condensation process, comprising:
   (a) continuously charging into a primary reactor:
      (i) at least one radically-polymerizable monomer having a radically polymerizable group and also having at least one condensation reactive functionality; and
      (ii) at least one modifying agent having a functional group capable of reacting with the condensation reactive functionality on the radically-polymerizable monomer, wherein each modifying agent is a monohydroxy alcohol, and wherein each modifying agent does not have the formula ROH, wherein R is a linear or branched chain alkyl radical having greater than 11 carbon atoms; and
   (b) maintaining an effective temperature in the primary reactor to cause polymerization of the monomer and to allow at least a portion of the condensation reactive functionality to react with the functional group of the modifying agent, wherein a first polymeric product is produced which incorporates at least some of the modifying agent, further comprising maintaining a flow rate through the primary reactor to provide an average residence time of less than about 60 minutes in the primary reactor.

3. The continuous polymerization and condensation process according to claim 2, wherein the effective temperature in the primary reactor is maintained between about 175° and about 345° C.

4. The continuous polymerization and condensation process according to claim 1 wherein the primary reactor is substantially free of any inert solvent.

5. The continuous polymerization and condensation process according to claim 1, wherein the primary reactor further comprises a headspace and the process further comprises purging the headspace with an inert gas.

6. The continuous polymerization and condensation process according to claim 1 wherein the primary reactor is selected from the group consisting of a loop reactor, a tube reactor, an extruder reactor, a continuous stirred tank reactor and any reactor suitable for continuous operation, including any combination in of reactors In series or parallel or both.

7. The continuous polymerization and condensation process according to claim 6 wherein the primary reactor is a continuous stirred tank reactor or loop reactor.

8. The continuous polymerization and condensation process according to claim 1, further comprising adding one or more additional components to the primary reactor, the additional components selected from the group consisting of a radically polymerizable monomer substantially free of condensation reactive groups, an inert solvent, a byproduct removal agent, and an initiator.

9. The continuous polymerization and condensation process according to claim 1, wherein the condensation reactive functionality is selected from the group consisting of a carboxyl, an ester, an anhydride, an epoxy, an amide, and an isocyanate functionality.

10. The continuous polymerization and condensation process according to claim 1, wherein at least two different radically-polymerizable monomers are charged into the primary reactor.

11. The continuous polymerization and condensation process according to claim 1, wherein the radically-polymerizable monomer has at least two different condensation reactive functionalities.

12. The continuous polymerization and condensation process according to claim 11, wherein the condensation reactive functionalities of the radically-polymerizable monomer are independently selected from the group consisting of a carboxyl, an ester, an anhydride, an epoxy, and an isocyanate.

13. The continuous polymerization and condensation process according to claim 1, wherein one of the radically-polymerizable monomers has at least two vinyl groups.

14. The continuous polymerization and condensation process according to claim 8, wherein one of the radically-polymerizable monomers has at least two vinyl groups.

15. The continuous polymerization and condensation process according to claim 1, wherein the first polymeric product comprises at least one cyclohexyl group.

16. The continuous polymerization and condensation process according to claims further comprising continuously charging into the primary reactor at least one vinyl aromatic monomer.

17. The continuous polymerization and condensation process according to claim 15, further comprising continuously charging into the primary reactor at least two different vinyl aromatic monomers.

18. The continuous polymerization and condensation process according to claim 1, further comprising adding a catalyst selected from the group consisting of esterification and transesterification catalysts to the primary reactor.

19. The continuous polymerization and condensation process according to claim 18, further comprising adding an esterification catalyst and a transesterification catalyst to the primary reactor.

20. The continuous polymerization and condensation process according to claim 1, further comprising separating a volatile material from the primary reactor to obtain two streams wherein one of the streams contains unreacted starting materials and is relatively free of byproduct.

21. The continuous polymerization and condensation process according to claim 20, further comprising adding the stream that is relatively free of the byproduct to the primary reactor.

22. A continuous polymerization and condensation process, comprising:
(a) continuously charging into a primary reactor:
(i) at least one radically-polymerizable monomer having a radically polymerizable group and also having at least one condensation reactive functionality; and
(ii) at least one modifying agent having a functional group capable of reacting with the condensation reactive functionality on the radically-polymerizable monomer, wherein each modifying agent is a monohydroxy alcohol, and wherein each modifying agent does not have the formula ROH, wherein R is a linear or branched chain alkyl radical having greater than 11 carbon atoms; and
(b) maintaining an effective temperature in the primary reactor to cause polymerization of the monomer and to allow at least a portion of the condensation reactive functionality to react with the functional group of the modifying agent, wherein a first polymeric product is produced which incorporates at least some of the modifying agent, wherein the process further comprises charging the first polymeric product from the primary reactor into a secondary reactor and maintaining an effective temperature in the secondary reactor to produce a second polymeric product, and withdrawing the second polymeric product continuously from the secondary reactor.

23. The continuous polymerization and condensation process according to claim 22, wherein the first polymeric product is charged continuously into the secondary reactor.

24. The continuous polymerization and condensation process according to claim 22, wherein the effective temperature in the secondary reactor is maintained between about 175° C. and about 345° C.

25. The continuous polymerization and condensation process according to claim 22, wherein the effective temperature maintained in the secondary reactor is different from the effective temperature maintained in the primary reactor.

26. The continuous polymerization and condensation process according to claim 22, wherein at least a portion of the modifying agent is added to the secondary reactor.

27. The continuous polymerization and condensation process according to claim 22, wherein the secondary reactor is selected from the group consisting of a loop reactor, a tube reactor, an extruder reactor, a continuous stirred tank reactor and any reactor suitable for continuous operation, including any combination in of reactors in series or parallel or both.

28. The continuous polymerization and condensation process according to claim 22, wherein the secondary reactor is vented.

29. The continuous polymerization and condensation process according to claim 22, wherein the secondary reactor has at least two different reaction zones, each reaction zone being independently temperature controlled.

30. The continuous polymerization and condensation process according to claim 29, further comprising adding the modifying agent to at least one of the different reaction zones in the secondary reactor.

31. The continuous polymerization and condensation process according to claim 29, wherein a modifying agent is added to at least one of the reaction zones in the secondary reactor, wherein the modifying agent added to the secondary reactor is different from the modifying agent added to the primary reactor.

32. The continuous polymerization and condensation process according to claim 22, further comprising charging the second polymeric product into an extruder reactor and charging the extruder reactor with an additional modifying agent, to produce a third polymeric product.

33. The continuous polymerization and condensation process according to claim 22, further comprising separating a volatile material from the secondary reactor to obtain two streams wherein one of the streams contains unreacted starting materials and is relatively free of byproduct.

34. The continuous polymerization and condensation process according to claim 33, further comprising adding the stream that is relatively free of the byproduct to the primary reactor.

35. The continuous polymerization and condensation process according to claim 33, further comprising adding the stream that is relatively free of the byproduct to the secondary reactor.

36. The polymeric product of the continuous polymerization and condensation process according to claim 1.

37. An overprint varnish, comprising the first polymeric product according to claim 1.

38. A coating, comprising the first polymeric product according to claim 1.

39. The coating according to claim 38, wherein the coating is a weatherable coating.

40. A coating modifier and compatibilizer, comprising the first polymeric product according to claim 1.

41. A dispersant, comprising the first polymeric product according to claim 1.

42. A polymer surfactant, comprising the first polymeric product according to claim 1.

43. A paint, comprising the first polymeric product according to claim 1.

44. The continuous polymerization and condensation process according to claim 1, further comprising maintaining a flow rate through the primary reactor to provide an average residence time of less than about 60 minutes in the primary reactor.

45. The continuous polymerization and condensation process according to claim 1, wherein the process further comprises charging the first polymeric product from the primary reactor into a secondary reactor and maintaining an effective temperature in the secondary reactor to produce a second polymeric product, and withdrawing the second polymeric product continuously from the secondary reactor.

46. The continuous polymerization and condensation process according to claim 1, wherein the radically-polymerizable monomer is selected from the group consisting of acrylic acid, methacrylic acid, and maleic anhydride.

47. The continuous polymerization and condensation process according to claim 1, wherein the modifying agent is selected from the group consisting of cyclohexanol, 4-methyl cyclohexyl methanol, diethylene glycol monoethyl ether, and isooctanol.

48. The continuous polymerization and condensation process according to claim 18, wherein the catalyst is selected from the group consisting of p-toluenesulfonic acid, methanesulfonic acid, sulfuric acid, phosphoric acid, manganese acetate, a titanate catalyst, and dibutyl tin oxide.

49. The continuous polymerization and condensation process according to claim 2, wherein the primary reactor is substantially free of any inert solvent.

50. The continuous polymerization and condensation process according to claim 2, wherein the primary reactor further comprises a headspace and the process further comprises purging the headspace with an inert gas.

51. The continuous polymerization and condensation process according to claim 2, wherein the primary reactor is selected from the group consisting of a loop reactor, a tube reactor, an extruder reactor, a continuous stirred tank reactor and any reactor suitable for continuous operation, including any combination in of reactors in series or parallel or both.

52. The continuous polymerization and condensation process according to claim 51, wherein the primary reactor is a continuous stirred tank reactor or loop reactor.

53. The continuous polymerization and condensation process according to claim 2, further comprising adding one or more additional components to the primary reactor, the additional components selected from the group consisting of a radically polymerizable monomer substantially free of condensation reactive groups, an inert solvent, a byproduct removal agent, and an initiator.

54. The continuous polymerization and condensation process according to claim 2, wherein the condensation reactive functionality is selected from the group consisting of a carboxyl, an ester, an anhydride, an epoxy, an amide, and an isocyanate functionality.

55. The continuous polymerization and condensation process according to claim 2, wherein at least two different radically-polymerizable monomers are charged into the primary reactor.

56. The continuous polymerization and condensation process according to claim 2, wherein the radically-polymerizable monomer has at least two different condensation reactive functionalities.

57. The continuous polymerization and condensation process according to claim 56, wherein the condensation reactive functionalities of the radically-polymerizable monomer are independently selected from the group consisting of a carboxyl, an ester, an anhydride, an epoxy, and an isocyanate.

58. The continuous polymerization and condensation process according to claim 2, wherein one of the radically-polymerizable monomers has at least two vinyl groups.

59. The continuous polymerization and condensation process according to claim 53, wherein one of the radically-polymerizable monomers has at least two vinyl groups.

60. The continuous polymerization and condensation process according to claim 2, wherein the first polymeric product comprises at least one cyclohexyl group.

61. The continuous polymerization and condensation process according to claim 2, further comprising continuously charging into the primary reactor at least one vinyl aromatic monomer.

62. The continuous polymerization and condensation process according to claim 60, further comprising continuously charging into the primary reactor at least two different vinyl aromatic monomers.

63. The continuous polymerization and condensation process according to claim 2, further comprising adding a catalyst selected from the group consisting of esterification and transesterification catalysts to the primary reactor.

64. The continuous polymerization and condensation process according to claim 63, further comprising adding an esterification catalyst and a transesterification catalyst to the primary reactor.

65. The continuous polymerization and condensation process according to claim 2, further comprising separating a volatile material from the primary reactor to obtain two streams wherein one of the streams contains unreacted starting materials and is relatively free of byproduct.

66. The continuous polymerization and condensation process according to claim 65, further comprising adding the stream that is relatively free of the byproduct to the primary reactor.

67. The polymeric product of the continuous polymerization and condensation process according to claim 2.

68. An overprint varnish, comprising the first polymeric product according to claim 2.

69. A coating, comprising the first polymeric product according to claim 2.

70. The coating according to claim 69, wherein the coating is a weatherable coating.

71. A coating modifier and compatibilizer, comprising the first polymeric product according to claim 2.

72. A dispersant, comprising the first polymeric product according to claim 2.

73. A polymer surfactant, comprising the first polymeric product according to claim 2.

74. A paint, comprising the first polymeric product according to claim 2.

75. The continuous polymerization and condensation process according to claim 2, wherein the process further comprises charging the first polymeric product from the primary reactor into a secondary reactor and maintaining an effective temperature in the secondary reactor to produce a second polymeric product, and withdrawing the second polymeric product continuously from the secondary reactor.

76. The continuous polymerization and condensation process according to claim 2, wherein the radically-polymerizable monomer is selected from the group consisting of acrylic acid, methacrylic acid, and maleic anhydride.

77. The continuous polymerization and condensation process according to claim 2, wherein the modifying agent having a functional group is selected from the group consisting of cyclohexanol, 4-methyl cyclohexyl methanol, diethylene glycol monoethyl ether, and isooctanol.

78. The continuous polymerization and condensation process according to claim 63, wherein the catalyst is selected from the group consisting of p-toluenesulfonic acid, methanesulfonic acid, sulfuric acid, phosphoric acid, manganese acetate, a titanate catalyst, and dibutyl tin oxide.

79. The continuous polymerization and condensation process according to claim 22, wherein the primary reactor is substantially free of any inert solvent.

80. The continuous polymerization and condensation process according to claim 22, wherein the primary reactor further comprises a headspace and the process further comprises purging the headspace with an inert gas.

81. The continuous polymerization and condensation process according to claim 22, wherein the primary reactor is selected from the group consisting of a loop reactor, a tube reactor, an extruder reactor, a continuous stirred tank reactor and any reactor suitable for continuous operation, including any combination in of reactors in series or parallel or both.

82. The continuous polymerization and condensation process according to claim 81, wherein the primary reactor is a continuous stirred tank reactor or loop reactor.

83. The continuous polymerization and condensation process according to claim 22, further comprising adding one or more additional components to the primary reactor, the additional components selected from the group consisting of a radically polymerizable monomer substantially free of condensation reactive groups, an inert solvent, a byproduct removal agent, and an initiator.

84. The continuous polymerization and condensation process according to claim 22, wherein the condensation reactive functionality is selected from the group consisting of a carboxyl, an ester, an anhydride, an epoxy, an amide, and an isocyanate functionality.

85. The continuous polymerization and condensation process according to claim 22, wherein at least two different radically-polymerizable monomers are charged into the primary reactor.

86. The continuous polymerization and condensation process according to claim 22, wherein the radically-polymerizable monomer has at least two different condensation reactive functionalities.

87. The continuous polymerization and condensation process according to claim 86, wherein the condensation reactive functionalities of the radically-polymerizable monomer are independently selected from the group consisting of a carboxyl, an ester, an anhydride, an epoxy, and an isocyanate.

88. The continuous polymerization and condensation process according to claim 22, wherein one of the radically-polymerizable monomers has at least two vinyl groups.

89. The continuous polymerization and condensation process according to claim 83, wherein one of the radically-polymerizable monomers has at least two vinyl groups.

90. The continuous polymerization and condensation process according to claim 22, wherein the first polymeric product comprises at least one cyclohexyl group.

91. The continuous polymerization and condensation process according to claim 22, further comprising continuously charging into the primary reactor at least one vinyl aromatic monomer.

92. The continuous polymerization and condensation process according to claim 90, further comprising continuously charging into the primary reactor at least two different vinyl aromatic monomers.

93. The continuous polymerization and condensation process according to claim 22, further comprising adding a catalyst selected from the group consisting of esterification and transesterification catalysts to the primary reactor.

94. The continuous polymerization and condensation process according to claim 93, further comprising adding an esterification catalyst and a transesterification catalyst to the primary reactor.

95. The continuous polymerization and condensation process according to claim 22, further comprising separating a volatile material from the primary reactor to obtain two streams wherein one of the streams contains unreacted starting materials and is relatively free of byproduct.

96. The continuous polymerization and condensation process according to claim 95, further comprising adding the stream that is relatively free of the byproduct to the primary reactor.

97. The polymeric product of the continuous polymerization and condensation process according to claim 22.

98. An overprint varnish, comprising the second polymeric product according to claim 22.

99. A coating, comprising the second polymeric product according to claim 22.

100. The coating according to claim 99 wherein the coating is a weatherable coating.

101. A coating modifier and compatibilizer, comprising the second polymeric product according to claim 22.

102. A dispersant, comprising the second polymeric product according to claim 22.

103. A polymer surfactant, comprising the second polymeric product according to claim 22.

104. A paint, comprising the second polymeric product according to claim 22.

105. The continuous polymerization and condensation process according to claim 22, wherein the radically-polymerizable monomer is selected from the group consisting of acrylic acid, methacrylic acid, and maleic anhydride.

106. The continuous polymerization and condensation process according to claim 105, wherein the modifying is selected from the group consisting of cyclohexanol, 4-methyl cyclohexyl methanol, diethylene glycol monoethyl ether, and isooctanol.

107. The continuous polymerization and condensation process according to claim 93, wherein the catalyst is selected from the group consisting of p-toluenesulfonic acid, methanesulfonic acid, sulfuric acid, phosphoric acid, manganese acetate, a titanate catalyst, and dibutyl tin oxide.

* * * * *